(12) United States Patent
Van der Wal et al.

(10) Patent No.: US 10,759,891 B2
(45) Date of Patent: Sep. 1, 2020

(54) COPOLYMER POLYOL WITH FUNCTIONAL ADDITIVE IN DISPERSED PHASE

(71) Applicant: Dow Global Technologies LLC, Midland, MI (US)

(72) Inventors: Hanno R. Van der Wal, Hoek (NL); Paul Cookson, Schindellegi (CH); Francois M. Casati, Pfaffikon (CH); Antoon De Smet, Oostburg (NL); Sven Claessens, Lokeren (BE); Prashant Tatake, Mumbai (IN); Bart Noordover, Eindhoven (NL); Brian Anthony, Yarraville (AU); Jozef Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 149 days.

(21) Appl. No.: 15/763,147

(22) PCT Filed: Sep. 7, 2016

(86) PCT No.: PCT/US2016/050546
§ 371 (c)(1),
(2) Date: Mar. 26, 2018

(87) PCT Pub. No.: WO2017/053064
PCT Pub. Date: Mar. 30, 2017

(65) Prior Publication Data
US 2018/0215855 A1   Aug. 2, 2018

(30) Foreign Application Priority Data

Sep. 25, 2015 (IN) .......................... 5129/CHE2015

(51) Int. Cl.
*C08K 3/22* (2006.01)
*C08K 5/06* (2006.01)
(Continued)

(52) U.S. Cl.
CPC ...... *C08G 18/0876* (2013.01); *C08G 18/3275* (2013.01); *C08G 18/409* (2013.01);
(Continued)

(58) Field of Classification Search
CPC .... C08K 3/22; C08K 5/0066; C08G 18/0876; C08G 18/632; C08G 18/409; C08G 18/4072

See application file for complete search history.

(56) References Cited

U.S. PATENT DOCUMENTS 4,293,657 A   10/1981 Nissen et al.
4,454,255 A   6/1984 Ramlow et al.
(Continued)

FOREIGN PATENT DOCUMENTS

WO       2008055622          5/2008
WO       WO-2013030173 A1 *  3/2013   .......... C08G 18/632

OTHER PUBLICATIONS

WO-2013030173_Mar. 2013_English Translation.*

*Primary Examiner* — Michael L Leonard

(57) ABSTRACT

A method for making a copolymer polyol includes (a) forming a pre-compounded thermoplastic polymeric composition by compounding from 10 wt % to 90 wt % of a solid functional additive component with from 10 wt % to 90 wt % of a polystyrene component, (b) melting the pre-compounded thermoplastic polymeric composition to form a melted thermoplastic polymeric composition, (c) combining the melted thermoplastic polymeric composition with a carrier polyol component in the presence of a stabilizer component to form a pre-mixture that includes the pre-compounded thermoplastic polymeric composition dispersed within a continuous phase of the carrier polyol component, and (d) cooling the pre-mixture to form the copolymer polyol.

10 Claims, 7 Drawing Sheets

(51) Int. Cl.
*C08G 18/08* (2006.01)
*C08G 18/63* (2006.01)
*C08G 18/76* (2006.01)
*C08G 18/32* (2006.01)
*C08G 18/40* (2006.01)
*C08G 18/66* (2006.01)
*C08G 18/72* (2006.01)
*C08G 18/48* (2006.01)
*C08G 18/81* (2006.01)
*C08G 18/71* (2006.01)
*C08K 5/00* (2006.01)

(52) U.S. Cl.
CPC ..... *C08G 18/4072* (2013.01); *C08G 18/4841* (2013.01); *C08G 18/632* (2013.01); *C08G 18/6688* (2013.01); *C08G 18/71* (2013.01); *C08G 18/721* (2013.01); *C08G 18/7621* (2013.01); *C08G 18/7664* (2013.01); *C08G 18/8108* (2013.01); *C08K 3/22* (2013.01); *C08K 5/0066* (2013.01)

(56) References Cited

U.S. PATENT DOCUMENTS

| | | |
|---|---|---|
| 4,550,194 A | 10/1985 | Reichel et al. |
| 4,640,949 A | 2/1987 | Wagman |
| 4,690,956 A | 9/1987 | Ramlow et al. |
| 4,810,729 A | 3/1989 | Davis et al. |
| 4,826,884 A | 5/1989 | Grace et al. |
| 4,849,459 A | 7/1989 | Grace et al. |
| 4,892,893 A | 1/1990 | Grace et al. |
| 5,087,384 A | 2/1992 | Horacek et al. |
| 5,118,721 A | 6/1992 | Godoy et al. |
| 5,153,233 A | 10/1992 | Godoy |
| 6,034,146 A | 3/2000 | Falke et al. |
| 6,512,024 B1 | 1/2003 | Lundgard et al. |
| 6,613,827 B2 | 9/2003 | Lundgard et al. |
| 8,822,581 B2 | 9/2014 | Van der Wal et al. |

* cited by examiner

COPOLYMER POLYOL WITH FUNCTIONAL ADDITIVE IN DISPERSED PHASE

FIELD

Embodiments relate to copolymer polyols with a functional additive in the dispersed phase, methods of making such copolymer polyols, and polyurethane products prepared using such copolymer polyols.

INTRODUCTION

Copolymer polyols (sometimes referred to as polymer polyols) are known in the art, e.g., as having a continuous polyol phase made up of one or more compounds having multiple hydroxyl groups and having particles of another polymer dispersed in the continuous polyol phase that forms a discontinuous phase. Copolymer polyols may be manufactured by forming the dispersed polymer directly within the continuous polyol phase. An advantage of this method is that the particles may be prepared directly at the desired particle size. Another potential method is to polymerize the discontinuous phase polymer separately, and then disperse the polymer into the polyol(s). It is thought that this approach could offer economical advantages, because the discontinuous phase polymer could be made in an inexpensive bulk polymerization process. The practical problem is that it may be very difficult to disperse the polymer particles into the polyol at the desired particle size and with a somewhat uniform molecular weight distribution. U.S. Pat. No. 6,613,827, discloses a method of dispersing a previously formed polymer by melting the polymer and then blending the molten polymer with the polyol under shear. The shearing action may break the molten polymer into small droplets, which become dispersed in the polyol phase. Upon cooling, a dispersion of polymer particles may be formed.

Dispersions that use polystyrene as the dispersed polymer in a continuous polyol phase are of interest, e.g., because polystyrene may function well as a dispersed phase material in polyurethane based applications. For example, U.S. Pat. No. 8,822,581 discloses a method for making a copolymer polyol, that includes mixing a melted thermoplastic polystyrene polymer with a liquid polyol in the presence of a stabilizer under conditions sufficient to disperse the polystyrene polymer in the form of droplets within a continuous phase of the liquid polyol and (b) cooling the polymer polyol to solidify the polystyrene polymer. Improvements of these dispersions that include polystyrene as the dispersed polymer in a polyol phase are sought, e.g., with respect to yellowing of appearance (e.g., due to ultraviolet light exposure) and/or fire behavior characteristics.

SUMMARY

Embodiments may be realized by providing a method for making a copolymer polyol that includes (a) forming a pre compounded thermoplastic polymeric composition by compounding from 10 wt % to 90 wt % of a solid functional additive component with from 10 wt % to 90 wt % of a polystyrene component, (b) melting the pre compounded thermoplastic polymeric composition to form a melted thermoplastic polymeric composition, (c) combining the melted thermoplastic polymeric composition with a carrier polyol component in the presence of a stabilizer component to form a pre-mixture that includes the pre compounded thermoplastic polymeric composition dispersed within a continuous phase of the carrier polyol component, and (d) cooling the pre-mixture to form the copolymer polyol.

DETAILED DESCRIPTION

Figure 1:
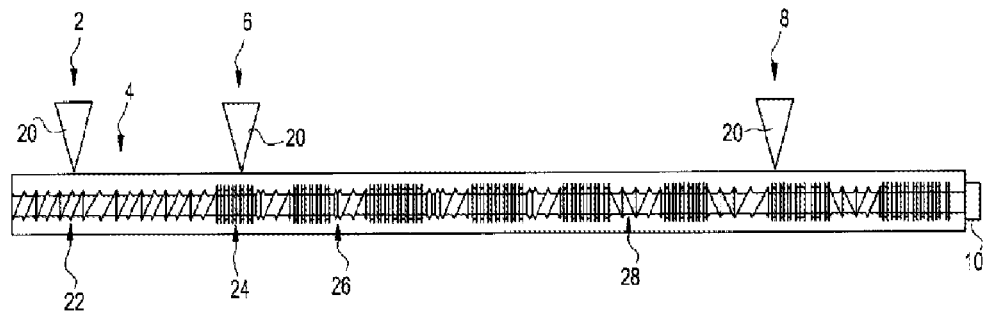
FIG. 1 illustrates an exemplary schematic representation of twin-screw extruder used to prepare a copolymer polyol.

Embodiments related to copolymer polyols prepared using non-aqueous mechanical dispersion processing. Formation of the copolymer polyols makes use of mechanical dispersion processing (e.g., a non-aqueous mechanical dispersion process), in which a liquid phase (such as a non-aqueous medium) and a solid phase is used to form the copolymer polyol. The liquid phase may include polyols and may substantially exclude additional added water. For example, the liquid phase may consist essentially of the carrier polyol component and the stabilizer component, and may exclude any separately added water. The carrier polyol component may include one or more carrier polyether polyols and/or one or more carrier polyester polyols. For the solids phase of the resultant copolymer polyols, in a first stage various combinations of solids are pre-compounded (e.g., using a first extruder) into a thermoplastic polymeric composition (e.g., in the form of granulized pellets or a paste). In embodiments, the solids include at least a polymeric component (such as a polystyrene component) and a functional additive component. Then, in a second stage at least one pre-compounded thermoplastic polymeric composition is dispersed in the liquid phase using the mechanical dispersion process (e.g., that may include the use of a second extruder different from the first extruder).

The mechanical dispersion process may involve compounding (e.g., using an extruder) of the pre-compounded thermoplastic polymeric composition with one or more liquids (e.g., a carrier polyol component and optionally a stabilizer component) to form a copolymer polyol having continuous polyol phase and a dispersed polymer phase. The dispersed polymer phase of the copolymer polyol includes at least the polymeric component (e.g., a polystyrene component) and the functional additive component in a pre-compounded form, and may optionally include at least a portion of the stabilizer component. According to embodiments, high levels of additives may be introduced in the dispersion of the copolymer polyol through the pre-compounded thermoplastic polymeric composition, while maintaining dispersion stability, and optionally while achieving appropriate average particle size of less than 10 micron and/or a desired viscosity. It may not be necessary to risk compromising stability (e.g., shelf life) of the dispersion/copolymer polyol and/or risk increasing the wear on process equipment (such as mixers and pumps) by adding additional fillers into the dispersion of the copolymer polyol. In particular, as would be understand by a person of ordinary skill in the art, blending additional solid additives into the liquid phase of a copolymer polyol, increases the risk over time of instability and/or wear on processing equipment. As such, according to embodiments, the stages of adding additional solid additives during the mechanical dispersion process and/or adding such additives after the resultant dispersion/copolymer polyol is formed may be excluded.

The polymeric component may include one or more polymers. For example, the polymeric component may be the polystyrene component that includes one or more different polystyrene polymers. Each polystyrene polymer is derived from styrene as the monomer and may optionally include at least one comonomer. In exemplary embodiments, each polystyrene polymer includes at least 25 wt % of units derived from styrene monomers. The carrier polyol component includes one or more polyols (such as polyether polyols) so as to introduce multiple hydroxyl groups into a liquid phase. The stabilizer component includes one or more stabilizers (e.g., one or more grafted copolymer based stabilizers). Exemplary stabilizers are discussed in U.S. Pat. No. 8,822,581. The functional additive component includes one or more different functional additives. The functional additive may be a solid compound, such as at least one selected from the group of a metal oxide, a flame retardant, an epoxy resin, a polyester resin, and a high density filler.

Exemplary mechanical dispersion processes for the preparation of the copolymer polyol includes: (a) introducing one or more solid pre-compounded thermoplastic polymeric compositions into an extruder (such as a twin-screw extruder), (b) melting the one or more pre-compounded thermoplastic polymeric compositions to form a melted thermoplastic polymeric composition, (c) mixing the melted thermoplastic polymeric composition with the carrier polyol component in the presence of the stabilizer component under conditions sufficient to disperse the one or more pre-compounded thermoplastic polymeric compositions (including the polystyrene polymers) in the form of droplets within a continuous phase of the carrier polyol component, and (d) cooling the droplets to at least partially solidify the melted thermoplastic polymeric composition (including the polystyrene polymers) to form the copolymer polyol. The presence of the stabilizer may enhance the ability of the polystyrene and/or functional additive to form into droplets and/or enhance the stability of the polystyrene and/or functional additive droplets in the resultant copolymer polyol. The droplets, once cooled to form particles, may remain dispersed in the carrier polyol component and may be resistant to settling.

According to exemplary embodiments, the resultant copolymer polyol may have a total solids content from 10 wt % to 80 wt % (e.g., from 10 wt % to 60 wt %, 10 wt % to 50 wt %, 10 wt % to 40 wt %, 10 wt % to 35 wt %, etc.). The pre-compounded thermoplastic polymeric composition accounts for 10 wt % to 100 wt % (e.g., from 20 wt % to 100 wt %, 20 wt % to 99 wt %, 40 wt % to 100 wt %, 40 wt % to 99 wt %, 60 wt % to 100 wt %, 60 wt % to 99 wt %, 80 wt % to 100 wt %, 80 wt % to 99 wt %, 85 wt % to 99 wt %, 90 wt % to 99 wt %, etc.) of a total weight of the solids in the resultant copolymer polyol. Optionally, a portion of the stabilizer component may account from 1 wt % to 20 wt % (e.g., 1 wt % to 15 wt %, 1 wt % to 10 wt %, 2 wt % to 10 wt %, 2 wt % to 7 wt %, etc.) of a total weight of the solids in the resultant copolymer polyol.

The pre-compounded thermoplastic polymeric composition may account for 5 wt % to 80 wt % (e.g., from 10 wt % to 70 wt %, 10 wt % to 60 wt %, 15 wt % to 50 wt %, 15 wt % to 45 wt %, 20 wt % to 40 wt %, etc.) of the total weight of the resultant copolymer polyol. The stabilizer component may account for 5 wt % to 60 wt % (e.g., from 10 wt % to 60 wt %, 10 wt % to 50 wt %, 15 wt % to 45 wt %, 15 wt % to 40 wt %, 20 wt % to 40 wt %, etc.) of the total weight of the resultant copolymer polyol. The carrier polyol component may account for 15 wt % to 90 wt % (e.g., from 20 wt % to 80 wt %, 20 wt % to 70 wt %, 30 wt % to 70 wt %, 30 wt % to 60 wt %, etc.) of the total weight of the resultant copolymer polyol. The copolymer polyol may be a low viscosity liquid (e.g., higher than 1000 mPA*s) or a paste. In exemplary embodiments, the pre-compounded thermoplastic polymeric composition may account for 19 wt % to 31 wt % of a total polymer feed for forming the overall resultant copolymer polyol. The stabilizer may account for 24 wt % to 36 wt % of a total stabilizer feed for forming the overall resultant copolymer polyol. The carrier polyol may account for 29 wt % to 56 wt % of a total carrier polyol feed for forming the overall resultant copolymer polyol.

The copolymer polyol according to exemplary embodiments may be used to prepare a polyurethane product, which polyurethane product is prepared using an isocyanate component and an isocyanate-reactive component. For example, the copolymer polyol may be included as the only polyol or as one polyol in a blend of two or more polyols in the isocyanate-reactive component used to form the polyurethane product. Exemplary polyurethane products include polyurethane foams, polyurethane elastomers, polyurethane coatings, polyurethane sealants, polyurethane adhesives, and polyurethane composite materials.

Dispersed Polymer Phase of Copolymer Polyol

According to embodiments, a pre-compounded thermoplastic polymeric composition may be used to form a dispersed polymer phase within the liquid phase of a copolymer polyol. Formation of the copolymer polyols may use the non-aqueous mechanical dispersion processing, e.g., the liquid phase may include a polyol based medium that is distinguishable from a water based medium. The dispersed polymer phase may not be readily dispersible in the liquid phase such that a mechanical dispersion process may be used to form the copolymer polyol. The mechanical dispersion process may optionally include the use of the stabilizer component to assist in dispersing the solid phase in the liquid phase.

The pre-compounded thermoplastic polymeric composition is derived from the functional additive component (that includes one or more functional additives) and the polystyrene component (that includes one or more polystyrene based polymers). The pre-compounded thermoplastic polymeric composition may be prepared by the combined used of a twin-screw extruder and an under-water granulating system. The dispersed polymer phase may only include one or more separately pre-compounded components derived from the functional additive component and the polystyrene component, which separately pre-compounded components are combined to form the pre-compounded thermoplastic polymeric composition.

For example, the dispersed polymer phase may include a first pre-compounded component that is derived from a first functional additive component that includes a first functional additive and a first polystyrene component. The dispersed polymer phase further includes a second separately pre-compounded component that is derived from a second functional additive component that includes a second functional additive that is different from the first functional additive and a second polystyrene component that is the same as or different from the first polystyrene component. Similarly, the dispersed polymer phase may be derived from third, fourth, etc., separately pre-compounded components (e.g., each formed using different functional additives). The separately pre-compounded components may be mixed (e.g., dry blended) together to form the pre-compounded thermoplastic polymeric composition, prior to starting the mechanical dispersion process. During the mechanical dispersion process, the pre-compounded thermoplastic polymeric composition may be melt blended together to form a single melted thermoplastic polymeric composition for use in forming the copolymer polyol.

The pre-compounded thermoplastic polymeric composition may have a final particle size from 0.5 μm to 40.0 μm (e.g., from 0.5 μm to 20.0 μm, from 0.5 μm to 10.0 μm, 1.0 μm to 7.0 μm, etc.). The functional additive may have a small particle size, e.g., less than 15 μm and/or less than 5 μm. The particle size of the functional additive may enhance the resultant foam properties. The solid particles of the resultant copolymer polyol including the pre-compounded thermoplastic polymeric composition may range in size from 1 μm to 20 μm.

The pre-compounded thermoplastic polymeric composition may include 10 wt % to 90 wt % (e.g., 20 wt % to 80 wt %, 30 wt % to 70 wt %, 40 wt %, 60 wt %, 45 wt % to 55 wt %, etc.) of the functional additive component and from 10 wt % to 90 wt % (e.g., 20 wt % to 80 wt %, 30 wt % to 70 wt %, 40 wt %, 60 wt %, 45 wt % to 55 wt %, etc.) of the polystyrene component, based on the total weight of the pre-compounded thermoplastic polymeric composition. As discussed above, the functional additive component may include one or more functional additives that are added via one or more separately pre-compounded components. The relative ratios of the separately pre-compounded components may be based on the desired total loading of the different functional additives. For example, the pre-compounded thermoplastic polymeric composition may include from 20 wt % to 80 wt % of a first pre-compounded component having a first functional additive and from 20 wt % to 80 wt % of a second pre-compounded component having second functional additive, whereas the first functional additive may be different from the second functional additive.

The functional additive component may include solid functional additives that introduce additional properties into the copolymer polyol and/or the resultant polyurethane product. Exemplary solid functional additives include metal oxides (such as titanium oxides, zinc oxides, and cesium oxides), pigments (e.g., that are not metal oxides), fire retardants, olefinic adhesion promoters, antioxidants, biocides, UV stabilizers (such as TINUVIN® 328 available from Ciba®), guanidine salts (such as guanidine carbonates), silica (such as hollow silica nanoparticles), hollow glass beads, infrared absorbing materials (such as borax, calcium carbonate, and alumina), polyurethane based powders (such as derived from rigid and/or flexible polyurethane foams), polyolefin resins (such as derived from $C_2$ to $C_{20}$ alpha-olefins), polyester resins (such as thermoplastic aliphatic polyester derived from renewable resources), epoxy resins, and/or fillers (such talc, clay, and hydrotalcite). The solid functional additives may be non-meltable (e.g., has a melting point of at least 200° C.) or meltable (e.g., has a melting point below 200° C.), at the conditions of pre-compounding. For example, the solid functional additives may be inorganic fillers that can be used to enhance material properties as related to fire behavior, specific mass, combustible content, thermal insulation, and/or chemical functionality.

For example, the solid functional additive component may include (e.g., consist essentially of) a non-meltable solid functional additive that has a melting point of at least 200° C. (e.g., up to 1200° C.), the non-meltable solid functional additive being selected from the group of a metal oxide, a flame retardant, and a high density filler. For example, the solid functional additive component may include (e.g., consist essentially of) a meltable solid functional additive that has a melting point below 200° C., the meltable solid functional additive being selected from the group of an epoxy resin and a polyester resin.

In exemplary embodiments, at least one pre-compounded component includes a metal oxide such as includes titanium dioxide as the functional additive. The metal oxide may be usable as a pigment so as to be referred to as a pigment metal oxide. The metal oxide may be first pre-blended with another optional functional additive prior to compounding with the polystyrene component. A total loading of the metal oxide (such as titanium dioxide) in the pre-compounded thermoplastic polymeric composition may be from 20 wt % to 70 wt % (e.g., 25 wt % to 65 wt %, 25 wt % to 55 wt %, etc.). A total loading of the metal oxide in the resultant copolymer polyol may be from 5 wt % to 30 wt % (e.g., 5 wt % to 25 wt %, 5 wt % to 20 wt %, 6 wt % to 20 wt %, 10 wt % to 20 wt %, etc.). By total loading it is meant that the functional additive is present in the amount indicated based on the total weight of the pre-compounded thermoplastic polymeric composition.

In exemplary embodiments, at least one pre-compounded component includes a flame retardant such as a halogen based flame retardants and a halogen-free flame retardants (known as flame retardants that do not include a halogen). Exemplary flame retardants are phosphorus based flame retardants, aluminum based flame retardants, and melamine based flame retardants. For example, the flame retardant may one known in the art for use in polyurethane foam products. The flame retardant may be first pre-blended with another optional functional additive prior to compounding with the polystyrene component. A total loading of the flame retardant in the pre-compounded thermoplastic polymeric composition may be from 20 wt % to 70 wt % (e.g., 20 wt % to 65 wt %, 20 wt % to 55 wt %, 20 wt % to 45 wt %, 20 wt % to 40 wt %, etc.). A total loading of the flame retardant in the resultant copolymer polyol may be from 5 wt % to 30 wt % (e.g., 5 wt % to 25 wt %, 5 wt % to 20 wt %, 5 wt % to 15 wt %, 5 wt % to 10 wt %, etc.)

In exemplary embodiments, at least one pre-compounded component includes a high density filler such as clay and/or hydrotalcite. For example, the high density filler may have a density greater than 1.2 $g/cm^3$ and optionally up to 5.0 $g/cm^3$. The high density filler may be a natural material, such as derived from natural inorganic minerals. The high density filler may be first pre-blended with another optional functional additive prior to compounding with the polystyrene component. The high density filler may be first pre-blended with another optional functional additive prior to compounding with the polystyrene component. A total loading of the high density filler (such as clay and/or hydrotalcite) in the pre-compounded thermoplastic polymeric composition may be from 20 wt % to 70 wt % (e.g., 25 wt % to 65 wt %, 25 wt % to 55 wt %, etc.). A total loading of the high density filler in the resultant copolymer polyol may be from 5 wt % to 30 wt % (e.g., 5 wt % to 25 wt %, 5 wt % to 20 wt %, 6 wt % to 20 wt %, 10 wt % to 20 wt %, etc.)

In exemplary embodiments, at least one pre-compounded component includes a solid epoxy resin such as a solid aromatic, cyclic, or aliphatic epoxy resin. The solid epoxy resin may have a softening temperature from 60° C. to 195° C. (e.g., from 80° C. to 195° C., 100° C. to 195° C., 120° C. to 195° C., etc.), according to ASTM D-3104. The epoxy resin may have an epoxide equivalent weight that is from 500 to 5000 g/equivalence (e.g., 1000 to 4000 g/eq, 1500 to 3700 g/eq, etc.) The solid epoxy resin may be first pre-blended with another optional functional additive prior to compounding with the polystyrene component. A total loading of the solid epoxy resin (such a high equivalent weight aromatic epoxy resin) in the pre-compounded thermoplastic polymeric composition may be from 20 wt % to 70 wt % (e.g., 25 wt % to 65 wt %, 25 wt % to 55 wt %, 30 wt % to 50 wt %, 35 wt % to 45 wt %, etc.). A total loading of the solid epoxy resin in the resultant copolymer polyol may be from 5 wt % to 30 wt % (e.g., 5 wt % to 25 wt %, 5 wt % to 20 wt %, 5 wt % to 15 wt %, 5 wt % to 10 wt %, etc.)

In exemplary embodiments, at least one pre-compounded component includes a solid polyester resin such as a solid aromatic, cyclic, or aliphatic polyester resin. The polyester resin may be derived from renewable resources, e.g., from lactic acid. The solid polyester resin may have a crystalline melt temperature from 60° C. to 195° C. (e.g., from 80° C. to 195° C., 100° C. to 195° C., 120° C. to 195° C., 140° C. to 195° C., etc.), according to ASTM D-3418. The solid polyester resin may be first pre-blended with another optional functional additive prior to compounding with the polystyrene component. A total loading of the solid polyester resin (such a polylactic acid resin) in the pre-compounded thermoplastic polymeric composition may be from 20 wt % to 70 wt % (e.g., 25 wt % to 65 wt %, 25 wt % to 55 wt %, 30 wt % to 50 wt %, 30 wt % to 40 wt %, etc.). A total loading of the solid polyester resin in the resultant copolymer polyol may be from 5 wt % to 30 wt % (e.g., 5 wt % to 25 wt %, 5 wt % to 20 wt %, 5 wt % to 15 wt %, 5 wt % to 10 wt %, 7 wt % to 12 wt %, etc.)

When the functional additive has a high melting point (such as greater than 200° C.), a desired particle size for the functional additive may be smaller than a desired particle size in the resultant copolymer polyol. For example, the particle size of Titanium Oxide may be smaller than the desired particle size (e.g., average particle size of less than 1 μm). If the functional additive has a relatively lower melting point (such as a melting point below the operating temperature of the extruder used for pre-compounding) the particle size may vary from smaller than or greater than the desired particle size in the resultant copolymer polyol. It is noted that some additives may be reduced in particle size during compounding, e.g., due to shearing.

Conventionally, solid fillers have been introduced by dispersing the solid fillers in preformed polymer dispersions through high shear mixing. Disadvantages of such methods include poor dispersion stability (i.e., short shelf lives), wear to pumps, derisibly high particle size, and/or unfavorable rheological properties of the resultant copolymer polyol. Embodiments are directed toward improving the manufacturing process and/or properties of the resultant copolymer polyol. In particular, as discussed herein, the solid fillers may be pre-compounded with the polystyrene component, prior to performing mechanical dispersion processing.

The polystyrene component includes one or more polystyrene polymers that are each individually a homopolymer or a copolymer based on styrene (the term copolymer is used interchangely with interpolymers with reference to polymers). In exemplary embodiments, each polystyrene polymer includes at least 25 wt % (e.g., at least 35 wt %, at least 45 wt %, at least 50 wt %, from 50 wt % to 100 wt %, from 60 wt % to 100 wt %, from 70 wt % to 100 wt %, from 80 wt % to 100 wt %, from 90 wt % to 100 wt %, from 95 wt % to 100 wt %, from 98 wt % to 100 wt % 100 wt %, etc.) of units derived from styrene monomers. As would be understood by a person of ordinary skill in the art, the at least one comonomer may be any monomeric unit that may be combined with styrene to form a polymer. The comonomer may be copolymerizable with styrene in block or random fashion, may not be highly polar or hydrophilic, and/or may not be reactive with an alcohol, primary or second amine, or isocyanate group (under the conditions at which the resultant copolymer polyol is produced, or under the conditions of a reaction of the copolymer polyol with an isocyanate to form a polyurethane and/or polyurea polymer). Exemplary comonomers include $C_2$ to $C_{20}$ alpha-olefins, acrylonitrile, butadiene, methyl methacrylate, butyl acrylate, and divinylbenzene.

The one or more polystyrene polymers may be thermoplastic. The one or more polystyrene polymers may have a melting or softening temperature of at least 80° C. (e.g., at least 110° C. and/or at least 130° C.). The melting or softening temperature may be less than 300° C. The polystyrene polymers may have a number average molecular weight from 5,000 g/mol to 1,000,000 g/mol (e.g., from 50,000 g/mol to 500,000 g/mol, from 100,000 g/mol to 200,000 g/mol, from 100,000 g/mol to 150,000 g/mol, etc.). The one or more polystyrene polymers may have a melt flow index from 1 to 1000 dg/min (e.g., from 1 to 500 dg/min, from 1 to 300 dg/min, from 1 to 100 dg/min, from 1 to 50 dg/min, from 20 to 50 dg/min, from 25 to 50 dg/min, etc.) according to ASTM D-1238 at 200° C. under a 5 kg applied load.

Carrier Polyol of Copolymer Polyol

The liquid phase of the copolymer polyol may include polyols and may substantial exclude additional added water (water may be introduce through the polyols and may be present in the liquid phase, e.g., in an amount of less than 5 wt % based on the total weight of the liquid phase). For example, the liquid phase may consist essentially of the carrier polyol component and the stabilizer component, and may exclude any separately added water. The carrier polyol component may include one or more carrier polyether polyols and/or one or more carrier polyester polyols. Optionally, the carrier polyol may be include less than 30 wt % of at least one polyol having a dispersed phase, such as a styrene-acrylonitrile (SAN) polyol, a polyharnstoff dispersion (PHD) polyol, and a polyisocyanate polyaddition (PIPA) polyol.

For example, carrier polyol component includes one or more carrier polyether polyols that are polymers of propylene oxide, ethylene oxide, and/or butylene oxide. The carrier polyol component may include one or more polyether polyols that have a nominal hydroxyl functionality from 2 to 8. The one or more carrier polyols may having a number average molecular weight from 100 g/mol to 6000 g/mol (e.g., from 500 g/mol to 6000 g/mol, from 1000 g/mol to 5500 g/mol, from 2000 g/mol to 5500 g/mol, from 3000 g/mol to 5500 g/mol, from 3500 g/mol to 5000 g/mol, 4200 g/mol to 5200 g/mol, etc.). The carrier polyol may be a polyoxypropylene carrier polyol or a polyoxypropylene-polyoxyethylene carrier polyol having a low ethylene oxide content (e.g., an EO content of greater than 1 wt % and less than 20 wt %, based on the total weight of the polyoxypropylene-polyoxyethylene carrier polyol). Exemplary carrier polyols are available under the tradenames VORANOL™ and VORAPEL™, available from The Dow Chemical Company.

The carrier polyether polyols may be prepared by polymerizing the propylene oxide, ethylene oxide, and/or butylene oxide in the presence of an initiator compound or mixture of initiator compounds. As would be understood by a person of ordinary skill in the art, the carrier polyether polyol may be prepared using KOH or DMC based catalysts. The initiator may include at least two oxyalkylatable hydrogen atoms. Hydroxyl groups, primary amine groups, secondary amine groups, and thiol groups are examples of groups that contain oxyalkylatable hydrogen atoms. Exemplary initiators are glycerin, water, ethylene glycol, propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, and propane diamine. Mixtures of two or more of the foregoing initiators may be used.

Stabilizer Component

The stabilizer component may include one or more stabilizers that are a copolymer of (1) from 10 wt % to 70 wt % a branched polyol that has a number average molecular weight from 4000 to 20,000 g/mol, from 0.2 to about 1.0 polymerizable ethylenically unsaturated groups per molecule, and a nominal hydroxyl functionality from 3 to 8; and (2) from 30 wt % to 90 wt % of styrene or a mixture of styrene and one or more other low molecular weight monomers (such as $C_2$ to $C_{20}$ alpha-olefin monomers). Each stabilizer may include from 20 wt % to 80 wt % of the copolymer and from 80 wt % to 20 wt % of one or more carriers. For example, the stabilizer may be a copolymer of from 10 to 40% by weight of (1) and 60 to 90% by weight of (2). The stabilizer may be a copolymer of from 15 to 35%, by weight of (1) and 65 to 85% by weight of (2). "Low molecular weight" monomers have a number average molecular weight of no greater than 500 (e.g., no greater than 150).

The stabilizer may be a preformed component that is used in the mechanical dispersion process for forming the copolymer polyol, or the stabilizer may be added as separate parts during the mechanical dispersion process. The stabilizer component may include stabilizers where the branched polyol discussed above is dissolved in a carrier polyol for forming the copolymer polyols. So said in another way, the branched polyol of the stabilizer may also correspond to the carrier polyol used to make the copolymer polyol.

An exemplary stabilizer is the reaction product of a mixture containing a) from 5 wt % to 15 wt % of the ethylenically unsaturated branched polyol; b) from 15 wt % to 35 wt % of styrene or a mixture of styrene and one or more other monomers having a number average molecular weight of 150 or less; c) from 20 wt % to 80 wt % of the starting branched polyol and/or at least one other polyol; and d) from 0 to 50 wt % of a non-polyol solvent having a number average molecular weight of 250 or less. For example, the stabilizer may be the reaction product of a mixture containing a) from 5 wt % to 12 wt % of the ethylenically unsaturated branched polyol; b) from 18 wt % to 30 wt % of styrene or a mixture of styrene and one or more other monomers having a number average molecular weight of 150 or less; c) from 25 wt % to 77 wt % of the starting branched polyol and/or at least one other polyol having a hydroxyl equivalent weight of from 300 to 2000; and d) from 0 to 48% by weight of a non-polyol solvent having a molecular weight of about 250 or less. For example, the stabilizer is the reaction product of a mixture containing a) from 5 to 10 weight percent of the ethylenically unsaturated branched polyol; b) from 20 to 30 weight percent of styrene; c) from 40 to 75 weight percent of the starting branched polyol; and d) from 0 to 35% by weight of a non-polyol solvent having a molecular weight of about 250 or less. Exemplary stabilizers are discussed in U.S. Pat. No. 8,822,581.

Copolymer Polyol

The copolymer polyol is prepared by a mechanical dispersion process that includes melting the pre-compounded thermoplastic polymeric composition and dispersing the molten composition into the carrier polyol component, in the presence of the stabilizer component. The conditions are sufficient to disperse the pre-compounded thermoplastic polymeric compositions (and the one or more separately pre-compounded components therewithin) in the form of droplets within a continuous phase of the carrier polyol component. The dispersion is then cooled to form particles. Exemplary, apparatus and methods for making the polymer polyol are described in U.S. Pat. Nos. 6,613,827 and 8,822,581.

The compounding stage of the mechanical dispersion process may include use of an extruder. By "extruder", it is meant a device having an elongated barrel, an outlet at or near one end of the barrel, mixing elements within the elongated barrel, and a means for pushing a liquid or molten material as essentially a plug flow through the mixing elements, to and out of the outlet. For example, the extruder will have one or more longitudinal, rotating screws located within the barrel (such as a twin-screw extruder). The screw or screws may be designed to perform both the pushing and mixing functions, although it is possible that the screws may perform only one or the other of these functions, and some other apparatus performs the other.

In exemplary embodiments, the pre-compounded thermoplastic polymeric composition may first be compounded in an extruder. The extruder used to pre-compound the thermoplastic polymeric composition may be different from (e.g., separate from) another extruder used in the mechanical dispersion process. The pre-compounded thermoplastic polymeric composition may be in the form of flakes or pellets.

According to exemplary embodiments, as discussed in the Examples, a first extruder used for pre-compounding may be different from a second extruder used in the mechanical dispersion process. The first extruder may be operated at a different speed or a same speed (e.g., from 100 rpm to 1100 rpm) as the second extruder (e.g., from 800 rpm to 1100 rpm). In exemplary embodiments, the first extruder may have a speed from 400 rpm to 1100 rpm and the second extruder may have a speed from 900 rpm to 1100 rpm. The first extruder and the second extruder may operate at similar temperature conditions, e.g., from 170° C. and 210° C.

With respect to the mechanical dispersion process, the pre-compounded thermoplastic polymeric composition may be fed into the extruder as pellets or as a molten or semi-molten material. The pellets or molten or semi-molten pre-compounded thermoplastic polymeric composition may be fed into the extruder through an injection port, a hopper, or similar feeding apparatus that can handle such a material. Then, the pre-compounded thermoplastic polymeric composition may be melted in a first section of the extruder (or in an upstream section of the extruder). Next, the one or more pre-compounded thermoplastic polymeric compositions may be mixed with the stabilizer component, or a mixture of the stabilizer and a portion of the carrier polyol component, in a first mixing section of an extruder. The stabilizer or stabilizer/carrier polyol mixture may be introduced into the extruder at the injection port or ports, and may be mixed with the pre-compounded thermoplastic polymeric composition in a mixing section. It is possible to pre-blend the pre-compounded thermoplastic polymeric composition with the stabilizer or stabilizer/carrier polyol mixture, and introduce the blend into the first mixing section where they are mixed as described below.

In an exemplary process, the proportions of the components in the first mixing section may typically result in the formation of a continuous phase of the pre-compounded thermoplastic polymeric composition. The stabilizer may be partially or entirely dissolved in the pre-compounded thermoplastic polymeric composition phase, or may be dispersed as droplets within the pre-compounded thermoplastic polymeric composition phase. If the carrier polyol is present in the first mixing section, it may form droplets dispersed in the pre-compounded thermoplastic polymeric composition phase, and the stabilizer molecules may tend to concentrate at the boundaries of the carrier polyol and pre-compounded thermoplastic polymeric composition phases. Mixing conditions in the first mixing section may be chosen to disperse the stabilizer (and carrier polyol if used) into the molten pre-compounded thermoplastic polymeric composition.

The temperature of the mixture in the first mixing section may be high enough so that the pre-compounded thermoplastic polymeric composition remains in a molten state. For example, the process temperature may be at least 15° C. and/or at least 25° C. above the glass transition temperature of the pre-compounded thermoplastic polymeric composition. It may be advantageous to use as high a temperature as possible in the first mixing section, consistent with the thermal stability of the various materials, to reduce the melt viscosity of the polystyrene component in the pre-compounded thermoplastic polymeric composition. Temperature conditions that result in significant degradation of the materials should typically be avoided. The necessary temperatures in any given case may depend on the particular starting materials that are used. It may be advantageous to use a temperature in from 180° C. to 200° C. so as to be above the crystalline melting or glass transition temperature of the polystyrene component of the pre-compounded thermoplastic polymeric composition.

The stabilizer may be preheated (and any polyol that may be present), before introduction into the first mixing section. For example, the stabilizer may be preheated to a temperature at or near the temperature that is desired in the first mixing section. Preheating of the stabilizer may minimize and/or reduce the possibility of localized cool spots and/or the possibility of the melted pre-compounded thermoplastic polymeric composition from solidifying locally.

Next, the resulting mixture of the first mixing section is conveyed to a second mixing section, where it is combined with the carrier polyol component. Additional stabilizer may be added in this step if desired. "Conveyed" in this context simply means that the mixture is moved downstream in the extruder to a zone where the second mixing step is performed. The use of the terms "first" and "second" mixing sections are used here only to indicate the relative order of these sections in the mechanical dispersion process. The description of the mixing sections as "first" and "second" is not intended to exclude the possibility of other mixing steps being performed in the process. It is also possible that either or both of the mixing steps as described may be conducted in a series of two or more distinct sub-steps, in a series of two or more distinct mixing sections of the extruder, or even in multiple devices.

The second mixing step may be performed through the normal operation of the extruder screw or screws, which move the material forward through the extruder in plug flow fashion. In the second mixing section, polystyrene polymers of the pre-compounded thermoplastic polymeric composition may be formed into droplets that become dispersed in a continuous phase of the liquid carrier polyol. The stabilizer will reside mainly at or near the interface between the carrier polyol phase and the polystyrene polymer droplets. The mixture is subjected to sufficient shear in the second mixing section, e.g., for dispersion of the pre-compounded thermoplastic polymeric composition (e.g., the polystyrene polymers therein) into discrete droplets of the desired size. For example, the polystyrene polymers may be formed into droplets from 100 nm to 100 microns in diameter (e.g., 250 nm to 20 microns and/or 500 nm to 20 microns).

Mixing ratios in the second mixing step may be such that the resultant copolymer polyol formed contains from 5 wt % to 80 wt % of the pre-compounded thermoplastic polymeric composition. The stabilizer may constitute from 5 wt % to 60 wt % of the resultant copolymer polyol. The liquid polyol phase may constitute from 15 wt % to 90 wt % of the resultant copolymer polyol.

The carrier polyol component may be preheated (similar to the stabilizer), before introduction into the second mixing section. For example, preheating of the carrier polyol component may minimize and/or reduce the possibility of localized cool spots and/or the possibility of the melted pre-compounded thermoplastic polymeric composition from solidifying locally. The temperature conditions in the second mixing section may be in general as described with respect to the first mixing section. The temperatures are not necessarily identical in the two mixing sections, but may be.

Because a polyol typically has a relatively low viscosity material, a back-pressure may be maintained in the extruder to minimize and/or reduce the possibility of the carrier polyol phase from running out of the extruder before the polystyrene polymers, etc. are dispersed therein. For example, the pressure may be maintained at 500 kPa or higher (e.g., at least 1000 kPa, up to 5000 kPa, up to 3000 kPa, etc.) The pressure in the first mixing section of the process may be less important, although the pressure in both the first and second mixing sections may be similar and/or the same.

When the extruder essentially operates in a plug flow mode, the pressure may be controlled in the second mixing section (and the extruder as a whole), to provide a region of restricted flow downstream of the second mixing section. The region of restricted flow may be located at or near the outlet end of the extruder. The "outlet end" is the portion of the extruder downstream from the second mixing section, through which the copolymer polyol product is removed from the extruder. The region of restricted flow may be described as a small cross-section region through which the copolymer polyol should flow to be removed from the extruder. The small cross-section limits the rate at which the copolymer polyol can flow through at a given pressure. The restriction of flow at this point may create a back-pressure upstream in the second mixing section and possibly the entire extruder.

After the pre-compounded thermoplastic polymeric composition has been dispersed into the carrier polyol, the resulting copolymer polyol is cooled enough to solidify at least the dispersed polystyrene polymer droplets in the pre-compounded thermoplastic polymeric composition to form particles. The copolymer polyol may be agitated until the particles have solidified, to reduce the possibility of, minimize, and/or prevent agglomeration and/or fouling of equipment. The size of the resulting particles may be very close to that of the droplets before they are cooled, although there may be some small differences (e.g., based on the thermal expansion or contraction and/or base on a phase change in the case of a crystalline or semi-crystalline polymer). The cooling step may be performed within the extruder or after the copolymer polyol is discharged from the extruder. If the copolymer polyol is cooled within the extruder, it may be cooled before reaching the region of restricted flow (e.g., to reduce the possibility of, minimize, and/or prevent fouling of the equipment in that region of the apparatus, and/or particle agglomeration from occurring there). In another embodiment, the cooling may be performed after the copolymer polyol is discharged from the extruder, such as by passing the copolymer polyol through a co- or counter-flow heat exchanger. It is also possible to cool the copolymer polyol in a mixing vessel operated at a low temperature in order to quench the discharge from the extruder.

The resultant copolymer polyol may be treated to remove volatiles, reaction by-products, unreacted monomers, and/or other impurities. If the stabilizer contains a solvent that was not previously removed, the solvent may be removed from the copolymer polyol product at this stage, e.g., by subjecting the copolymer polyol to heat and/or a reduced pressure. Temperatures may not be so high as to melt or soften the dispersed particles of the pre-compounded thermoplastic polymeric composition. It is also possible to devolatilize the polymer polyol in a decompression zone of the extruder, before or after the cooling step.

FIG. 1 illustrates an exemplary schematic of an exemplary twin screw extruder for preparing a copolymer polyol. Referring to FIG. 1, the twin-screw extruder includes multiple feed ports 20 (e.g., for separately adding the pre-compounded thermoplastic polymeric composition, the stabilizer, and the carrier polyol). The twin-screw further includes forwarding element 22, gear mixer 24, blister element 26, and reverse element 28. The pre-compounded thermoplastic polymeric composition may enter the extruder through a first feed port 2 of the multiple feed ports 20, coinciding with the forwarding element 22. The pre-compounded thermoplastic polymeric composition may be melted in the initial zone 4 of the twin-screw extruder. The stabilizer component (optionally including a polyol) may enter through the second feed port 6 of the multiple feed ports 20, coinciding with the gear mixer 24. Further downstream, e.g., after the blister element 26 and the reverse element 28, the carrier polyol component may enter through a third feed port 8 of the multiple feed ports 20. The stable dispersion exits the extruder through an exit port 10.

The copolymer polyol may include various optional additives added during the mechanical dispersion process. Exemplary optional additives include fillers, other metal oxides, reinforcing agents, antioxidants, compatibilizer, flame retardants, and recycled polyurethane foam powder (e.g., derived from flexible and/or rigid foams, and exemplary powders are discussed in U.S. Pat. No. 6,670,404). The optional additives added during the mechanical dispersion process are distinguishable from functional additive component added to the pre-compounded thermoplastic polymeric composition. As would be understood by a person of ordinary skill in the art, a portion of the functional additive may be present in the liquid phase (e.g., mixed with the polyol carrier) and based on the presence of the stabilizer component the resultant copolymer polyol may be stable.

Polyurethane Products

The copolymer polyol is useful to make a wide variety of polyurethane products, such as slabstock foams, molded foams, flexible foams, viscoeleastic foams, combustion modified foams, rigid foams, elastomers, adhesives, sealants, and/or coatings. The polyurethane product may be useful in a variety of packaging applications, comfort applications (such as mattresses—including mattress toppers, pillows, furniture, seat cushions, etc.), shock absorber applications (such as bumper pads, sport and medical equipment, helmet liners, etc.), thermal insulation applications, electroconductivity for anti-static packaging of electronic goods, and noise and/or vibration dampening applications (such as earplugs, automobile panels, etc.).

The polyurethane product may be prepared as the reaction product of a polyurethane forming formulation that includes an isocyanate component and an isocyanate-reactive component. The isocyanate component may include one or more polyisocyanates, one or more isocyanate-terminated prepolymers, and/or a combination thereof. The copolymer polyol may be the only polyol or one of two or more polyols (e.g., to adjust the solids content to a desired level or provide particular characteristics to the polyurethane) included in the isocyanate-reactive component. The isocyanate-reactive component and/or the isocyanate-component may further include at least one additive. Exemplary additives include catalysts, surfactants, blowing agents, and other additives for polyurethanes as would be known to a person of ordinary skill in the art.

With respect to the isocyanate component, exemplary isocyanates include aromatic, cycloaliphatic, and aliphatic isocyanates, and isocyanate-terminated prepolymer derived from at least one selected from the group of aromatic, cycloaliphatic, and aliphatic isocyanates. For example, the isocyanate component may include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate, 4,4'-dimethyldiphenylmethane-2,2',5,5'-tetraisocyanate, and/or isocyanate-terminated prepolymers derived therefrom.

The amount of isocyanate component used in making a polyurethane product is commonly expressed in terms of isocyanate index. The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100. In embodiments, the isocyanate index may range from about 85 to 160 (e.g., 95 to 140, 95 to 120, etc.)

With respect to the isocyanate-reactive component, the copolymer polyol may be blended with one or more additional polyols. For example, the copolymer polyol may comprise from 5 wt % to 90 wt % (e.g., 5 wt % to 80 wt %, 10 wt % to 70 wt %, 10 wt % to 60 wt %, 15 wt % to 50 wt %, 15 wt % to 40 wt %, 15 wt % to 30 wt %, 15 wt % to 25 wt %, etc.) of the isocyanate-reactive component. The additional polyol, may be a polyether polyol having a nominal hydroxyl functionality of 2 to 4 and a number average molecular weight from 1000 g/mol to 8000 g/mol.

The polyurethane formulation, such as the isocyanate-reactive component, may further include at least one catalyst directed toward promoting the polyurethane-forming reaction. The at least one catalysts may be included in a total amount from 0.001 wt % to 5 wt % of the isocyanate-reactive component. The selection of a particular catalyst package may vary somewhat with the particular application, the particular copolymer polyol or dispersion that is used, and/or the other components in the formulation. The catalyst may catalyze the "gelling" reaction between the polyol(s) and the isocyanate and/or the water/polyisocyanate (blowing) reaction that generates urea linkages and free carbon dioxide to expand the foam. A wide variety of materials are known to catalyze polyurethane-forming reactions, including tertiary amines, tertiary phosphines, various metal chelates, acid metal salts, strong bases, various metal alcoholates and phenolates, and metal salts of organic acids.

The polyurethane formulation, such as the isocyanate-reactive component, may further include at least one surfactant. For example, the surfactant may be a silicone surfactant. As would be understood by a person of ordinary skill in the art, a variety of silicone surfactants may be used for forming polyurethane products.

The polyurethane formulation, such as the isocyanate-reactive component, may further include at least one flame retardant that is separate from the copolymer polyol. The flame retardant may be a solid or a liquid. The additive component may include a non-halogenated flame retardant and/or a halogenated flame retardant. Exemplary flame retardants include melamine, phosphorous compounds with or without halogens, aluminum containing compounds with or without halogens, nitrogen based compounds with or without halogens, chlorinated compounds, brominated compounds, expandable graphite, boron derivatives, and polyureas. A total amount of flame retardant in the formulation for forming the CME polyurethane foam is less than 50 parts (e.g., from 45 parts to 1 part, from 40 to 10 parts, from 35 parts to 15 parts, etc.) by weight per 100 parts weight of the isocyanate-reactive component.

The polyurethane formulation, such as the isocyanate-reactive component, may further include at least one blowing agent. Exemplary blowing agents include physical blowing agents such as various low-boiling chlorofluorocarbons, fluorocarbons, hydrocarbon, and hydroflouroolefins. Fluorocarbons and hydrocarbons having low or zero global warming and ozone-depletion potentials are useful as physical blowing agents. Chemical blowing agents that decompose or react under the conditions of the polyurethane-forming reaction are also useful. Exemplary embodiments may include water is a blowing agent, e.g., as a sole blowing agent or in combination with a physical blowing agent.

In addition to the foregoing components, the polyurethane formulation may contain various other optional additives, e.g., optional additives that are known in the art for forming polyurethane products. Exemplary optional additives include cell openers, curatives, antioxidants, UV stabilizers, antistatic agents, mold release agents, fillers (as calcium carbonate), other pigments/colorants/dyes (such as chromium oxide, azo/diazo dyes, phthalocyanines, dioxazines, and carbon black), and reinforcing agents (such as fiber glass, carbon fibers, flaked glass, mica, and talc; antioxidants), and flame retardants.

It is noted that incorporating solid functional additives, such as titanium dioxide, in polyurethane products (such as a polyurethane foam) by pre-blending in the isocyanate-reactive component is feasible, but requires proper mixing equipment and intensive labor and/or the amount of the solid functional additive that may be added is highly restricted based on such processing concerns. Further, such blends may not be stable over time and may readily phase separate, which also further restrict the amount of the solid functional additive that may be used. Accordingly, embodiments related to adding such solid functional additives as pre-compounded with a polystyrene component when forming the copolymer polyol. Further, impregnation of a polyurethane foam with a solid suspension, followed by drying, is another technique that could be used for adding such solid functional additives, but such a technique may not be economically viable on a large scale. Accordingly, using the modified copolymer polyol discussed herein, simplifies the industrial process and may not have an adverse impact on the added function provided by the functional additive. For example, if titanium oxide is added to a polyurethane formulation (e.g., for forming a foam) a same or similar level of UV protection may be afforded by the $TiO_2$ particles when added through the modified copolymer polyol in comparison as to when added directly to the isocyanate-reactive component. Further, the $TiO_2$ particles may be more storage stable as being embedded in polystyrene and/or polyurethane and/or may be used at relatively low levels (e.g., less than 5% by weight of the resultant polyurethane foam).

According to an exemplary embodiment, the polyurethane product by a combustion modified ether (CME) polyurethane foam that exhibits desirable properties when exposed to a sufficient heat source. For example, the CME polyurethane foam may be adapted to pass the British Standard Crib 5 flammability test (BS 5852—ignition source 5), which uses a wooden assembly (referred to as a crib) as a source of ignition and may be used to determine the ignitability of upholstered furniture composites and/or complete pieces of furniture by arranging an assembly of upholstered composites to represent typical chairs. To meet the requirements of the Crib 5 flammability test, the sample when exposed to a flame under the test conditions, must self-extinguish in less than 10 minutes with a weight loss of less than 60 g (including the wooden crib), and a width of foam damage must be less than 10 cm on either side of the wooden crib without burning through the sample. According to exemplary embodiments, the polyurethane foam formulation enables the formation of CME polyurethane foams that pass the Crib 5 flammability test across a wide range of densities (e.g., from 10 $kg/m^3$ to 100 kg/m3, 15 $kg/m^3$ to 50 $kg/m^3$, etc.), which wide range includes low densities. For example, at lower densities the CME foams may have less amounts of flame retardants (i.e., in an effort to achieve the lower density) and still pass the Crib 5 flammability test.

If the polyurethane product is a foam, product may be formed using a one-shot method, such a slabstock process (e.g., as free rise foam), a molding process (such as in a box foaming process), or any other process known in the art. In a slabstock process, the components may be mixed and poured into a trough or other region where the formulation reacts, expands freely in at least one direction, and cures. Slabstock processes may be operated continuously at commercial scales. In a molding process, the components may be mixed and poured into a mold/box (heated or non-heated) where the formulation reacts, expands without the mold in at least one direction, and cures.

The polyurethane foam may be prepared at initial ambient conditions (i.e., room temperature ranging from 20° C. to 25° C. and standard atmospheric pressure of approximately 1 atm). For example, the polyurethane foam may include the solid functional additive (e.g., a polymer that has a melting point above 100° C.), added via the modified copolymer polyol, without requiring heating or application of pressure to the isocyanate-reactive component. Foaming at pressure below atmospheric condition can also be done, to reduce foam density and soften the foam. Foaming at pressure above atmospheric condition can be done, to increase foam density and therefore the foam load bearing as measured by indentation force deflection (IFD). In a molding processing, the polyurethane foam may be prepared at initial mold temperature above ambient condition, e.g., 50° C. and above. Overpacking of mold, i.e. filling the mold with extra foaming material, can be done to increase foam density.

The following examples are provided to illustrate the invention, but are not intended to limit the scope thereof. All parts and percentages are by weight unless otherwise indicated. All molecular weight values are based on number average molecular weight, unless indicated otherwise.

EXAMPLES

Approximate properties, characters, parameters, etc., are provided below with respect to various working examples, comparative examples, and the materials used in the working and comparative examples.

Preparation of Copolymer Polyols with Additive

The following materials are principally used in forming the exemplary copolymer polyols with filler:

| | |
|---|---|
| Polystyrene | Polystryrene prepared using styrene as a monomer, having a number molecular weight of 130,000 g/mol and a melt flow rate greater than 30 dg/min @ 200° C./5 kg according to ASTM D-1238 (exemplary polystyrene grades are now available from Americas Styrenics and Trinseo). |
| Titanium Dioxide ($TiO_2$) | A titanium dioxide product having greater than 95.5% $TiO_2$ content marketed as a rutile pigment produced by the chloride process for use in plastics, having an average particle size from 0.1 to 0.3 μm (available as Kronos ® 2211 from Kronos). |
| Flame Retardant 1 (FR1) | A phosphoric acid based flame retardant (1-methylethylidene)di-4,1-phenylene tetraphenyl ester, believed to have an average particle size around 7 μm (available as Reofos ® BAPP from Chemtura). |
| Flame Retardant 2 (FR2) | An aluminum polyphosphate based halogen free flame retardant (available as FR Cros C60 from Budenheim). |
| Flame Retardant 3 (FR3) | A melamine cyanurate based halogen free flame retardant, believed to have an average particle size from 2-3 μm (available as Budit 315 from Budenheim). |
| Flame Retardant 4 (FR4) | A coated grade of FR3, believed to have an average particle from 2-3 μm (available as Budit 315S from Budenheim). |
| Stabilizer 1 | A developmental stabilizer that is a copolymer of m-isopropenyl-α,α-dimethylbenzyl isocyanate (TMI) capped polyols having terminal vinyl unsaturation (and formed using a high molecular weight sorbitol-initiated polyol having an ethylene oxide content of 10 wt %) and styrene copolymerized in the presence of a carrier polyol, the stabilizer having 20 wt % of macromer based on the TMI capped polyols, 20 wt % of styrene monomer, and 60 wt % of a first carrier polyol (available as VORANOL ™ EP 1900 from The Dow Chemical Company), and having a solids content of 20 wt % (prepared using a process similar to as discussed with respect to Exemplary Stabilizer 1-13 in U.S. Pat. No. 8,822,581). |
| Stabilizer 2 | A developmental stabilizer that is a copolymer of m-isopropenyl-α,α-dimethylbenzyl isocyanate (TMI) capped polyols having terminal vinyl unsaturation (and formed using a high molecular weight sorbitol-initiated polyol having an ethylene oxide content of 10 wt %) and styrene copolymerized in the presence of a carrier polyol, the stabilizer having 20 wt % of macromer based on the TMI capped polyols, 20 wt % of styrene monomer, and 60 wt % of a second carrier polyol (a 12,000 number average molecular weight sorbitol initiated propylene oxide-ethylene oxide derived polyether polyol, having a propylene oxide derived block and ethylene oxide derived end capping, an ethylene oxide content of 10 wt %, based on the total weight of the polyol, a hydroxyl number from 28.0 to 31.0 mg KOH/g) and having a solids content of 20 wt % (prepared using a process |

|  | -continued |
| --- | --- |
| Carrier Polyol 1 | similar to as discussed with respect to Exemplary Stabilizer 1-13 in U.S. Pat. No. 8,822,581). A glycerine initiated polyoxypropylene polyol having polyoxyethylene capping, a hydroxyl number from 33 to 38 mg KOH/g, and a number average molecular weight of 4,700 (available as VORANOL ™ 4735 from The Dow Chemical Company). |

Exemplary copolymer polyols are prepared as such below. In particular, $TiO_2$ Modified CPP 1 to 18 are prepared using Titanium Dioxide pre-compounded with Polystyrene as a polymer feed and then used in the mechanical dispersion process. FR1 Modified CPP 1 to 8 are prepared using Flame Retardant 1 pre-compound with Polystyrene as a polymer feed and then used in the mechanical dispersion process. FR2 Modified CPP 1 and 2 are prepared using Flame Retardant 2 pre-compound with Polystyrene as a polymer feed and then used in the mechanical dispersion process With respect to the examples, the Polystyrene and one of Titanium Dioxide/Flame Retardant 1/Flame Retardant 2 are pre-compounded into a polymer matrix. For pre-compounding, a twin screw extruder (type ZSK 25) in combination with an under-water granulating system (UWG, exemplary systems are available from Pfleiderer) is used. The under-water granulating system may be used for cooling the product exiting the extruder and for forming pellets for easy feeding into a second extruder. The under-water granulated system is not necessary, e.g., the product of the first extruder may be feed directly into a second extruder. The twin screw extruder has a screw diameter of 25 mm and a barrel length of 1050 mm The extruder is operated at a temperature from about 180° C. and 200° C. and at a speed ranging from 500 to 1200 rpm depending on the system at hand. Thereafter, the resultant material exiting the extruder is cut into pellets.

For the mechanical dispersion process, the polymer matrix is fed to a second twin screw co-rotating extruder fitted with two liquid lines, one for the stabilizer and the other for the carrier polyol, and a granular hopper for the polymer feed. The other twin screw extruder has a screw diameter of 25 mm and barrel length of 940 mm The feed system consists of three loss-in-weight feeders operated via a "disocont-master" controller. The polymer feed granulate is fed to the first section of the extruder barrel, where it is heated and transported forward. The liquids are stored in a heated tank from which they are pumped through heated tubing to the injection nozzles, located along the extruder barrel, by means of a gear pump. The extruder is operated at a temperature from about 180° C. and 200° C. and at a speed ranging from 500 to 1200 rpm depending on the system at hand. After the dispersion has been prepared in the extruder, the product is sent through a product handling section, comprising a heated three-way valve to direct the product stream to either a waste drum or to a heat exchanger system and a product drum. Samples are filtered over a nylon mesh filters (pore size: 150 μm).

For product characterization, the collected samples are submitted for solids content determination (mini-pulsed NMR method), particle size distribution measurements (light scattering technique, performed on a Beckman Coulter LS230) and viscosity measurements (cone & plate measurements at different shear rates). The total solids content refers to the polystyrene dispersed phase content and stabilizer solids content. The filler content (such as $TiO_2$ Content, FR1 Content, and FR2 Content) refers to the content in the final dispersion, e.g., when 20 wt % of polystyrene compound is loaded with 30 wt % titanium oxide, the content is calculated based on 0.3*20=6 wt % $TiO_2$ content.

Referring to Table 1, Examples $TiO_2$ Modified CPP 1 to 18 and Modified CPP A are prepared according to the following formulations, respectively, and are evaluated as follows:

TABLE 1

|  | Overall CPP composition (wt %/wt %/wt %) | Total Solids Content (wt %) | $TiO_2$ Content (wt %) | Average Particle Size (μm) | Viscosity (25° C., 10 s$^{-1}$) (mPa · s) |
| --- | --- | --- | --- | --- | --- |
| 30 wt % Titanium Oxide - 70 wt % Polystyrene for Polymer Feed | | | | | |
| $TiO_2$ Modified CPP 1 | 20/20/60* | 24.0 | 6.0 | 3.96 | 2640 |
| $TiO_2$ Modified CPP 2 | 30/30/40* | 36.0 | 9.0 | 3.92 | 6230 |
| $TiO_2$ Modified CPP 3 | 35/35/30* | 42.0 | 10.5 | 4.16 | 11200 |
| $TiO_2$ Modified CPP 4 | 38/35/27* | 45.0 | 11.4 | 3.84 | 16600 |
| $TiO_2$ Modified CPP 5 | 38/33/29* | 44.6 | 11.4 | 3.25 | 14100 |
| $TiO_2$ Modified CPP 6 | 40/33/27* | 46.6 | 12.0 | 3.59 | 17300 |
| 40 wt % Titanium Oxide - 60 wt % Polystyrene for Polymer Feed | | | | | |
| $TiO_2$ Modified CPP 7 | 20/20/60* | 24.0 | 8.0 | 5.41 | 2460 |
| $TiO_2$ Modified CPP 8 | 30/30/40* | 36.0 | 12.0 | 4.35 | 5600 |
| $TiO_2$ Modified CPP 9 | 35/35/30* | 42.0 | 14.0 | 4.31 | 10700 |
| $TiO_2$ Modified CPP 10 | 38/35/27* | 45.0 | 15.2 | 4.30 | 14300 |
| $TiO_2$ Modified CPP 11 | 38/33/29* | 44.6 | 15.2 | 4.11 | 13400 |
| $TiO_2$ Modified CPP 12 | 40/33/27* | 46.6 | 16.0 | 3.91 | 17000 |

TABLE 1-continued

|  | Overall CPP composition (wt %/wt %/wt %) | Total Solids Content (wt %) | TiO$_2$ Content (wt %) | Average Particle Size (μm) | Viscosity (25° C., 10 s$^{-1}$) (mPa · s) |
|---|---|---|---|---|---|
| 50 wt % Titanium Oxide - 50 wt % Polystyrene for Polymer Feed | | | | | |
| TiO$_2$ Modified CPP 13 | 20/20/60* | 24.0 | 10.0 | 6.94 | 2240 |
| TiO$_2$ Modified CPP 14 | 30/30/40* | 36.0 | 15.0 | 6.77 | 4960 |
| TiO$_2$ Modified CPP 15 | 35/35/30* | 42.0 | 17.5 | 6.05 | 9720 |
| TiO$_2$ Modified CPP 16 | 38/35/27* | 45.0 | 19.0 | 5.77 | 13100 |
| TiO$_2$ Modified CPP 17 | 38/33/29* | 44.6 | 19.0 | 6.04 | 11800 |
| TiO$_2$ Modified CPP 18 | 40/33/27* | 46.6 | 20.0 | 5.14 | 14400 |
| Modified CPP A | 35/35/30** | 42.0 | 17.5 | 2.40 | 7650 |

*Ratio represents Polymer Feed wt %/Stabilizer 1 wt %/Carrier Polyol 1 wt %, based on total weight thereof.
**Ratio represents Polymer Feed wt %/Stabilizer 2 wt %/Carrier Polyol 1 wt %, based on total weight thereof The overall CPP composition is provided as the relative amount by weight percent of the polymer feed (amount of pre-compounded Polystyrene and Titanium Oxide, at the indicated ratio), to the Stabilizer 1 (or Stabilizer 2 for Modified CPP A), and to the Carrier Polyol 1. This ratio is referred to as the ratio of Polymer Feed/Stabilizer/Carrier Polyol, based on the total weight of the all polymer feeds, all stabilizers, and all carrier polyol used to make the copolymer polyol. For the examples in Table 1, the second twin screw extruder is run at 500 rpm.

Referring to Table 2, Examples FR1 Modified CPP 1 to 8, FR 2 Modified CPP 1 and 2, Modified CPP B, and Modified CPP C are prepared according to the following formulations, respectively, and are evaluated as follows:

The overall CPP composition is provided as the relative amount by weight percent of the polymer feed (amount of pre-compound Polystyrene and one of FR 1 to FR 4) to the Stabilizer 1 (or Stabilizer 2 for Modified CPP B and Modified CPP C) and to the Carrier Polyol 1. This ratio is referred to as the ratio of Polymer Feed/Stabilizer/Carrier Polyol, based on the total weight of the based on the total weight of the all polymer feeds, all stabilizers, and all carrier polyol used to make the copolymer polyol. For the examples in Table 2, the second twin-screw extruder is run at the rpm indicated above.

TABLE 2

|  | Overall CPP composition (wt %/wt %/wt %) | Extruder RPM | Total Solids Content (wt %) | FR1 Content (wt %) | Average Particle Size (μm) | Viscosity (25° C., 10 s$^{-1}$) (mPa · s) |
|---|---|---|---|---|---|---|
| 25 wt % Flame Retardant 1 (FR1)-75 wt % Polystyrene for Polymer Feed | | | | | | |
| FR1 Modified CPP 1 | 20/20/60* | 500 | 24 | 5.0 | 15.57 | 2800 |
| FR1 Modified CPP 2 | 30/30/40* | 500 | 36 | 7.5 | 9.53 | 5320 |
| FR1 Modified CPP 3 | 30/30/40* | 200 | 36 | 7.5 | 3.05 | 5210 |
| FR1 Modified CPP 4 | 35/35/30* | 200 | 42 | 8.75 | 3.52 | 8260 |
| FR1 Modified CPP 5 | 35/35/30* | 300 | 42 | 8.75 | 3.02 | 8910 |
| FR1 Modified CPP 6 | 35/35/30* | 500 | 42 | 8.75 | 7.95 | 8410 |
| FR1 Modified CPP 7 | 40/40/20* | 500 | 48 | 10.0 | 6.58 | 15000 |
| FR1 Modified CPP 8 | 40/40/20* | 200 | 48 | 10.0 | 2.77 | 14300 |
| 25 wt % Flame Retardant 2 (FR2)-75 wt % Polystyrene for Polymer Feed | | | | | | |
| FR2 Modified CPP 1 | 20/20/60* | 1000 | 24 | 5.0 | 8.27 | 2590 |
| FR2 Modified CPP 2 | 30/30/40* | 1000 | 36 | 7.5 | 5.04 | 4910 |
| 35 wt % Flame Retardant 3 (FR3)-75 wt % Polystyrene for Polymer Feed | | | | | | |
| Modified CPP B | 20/25/55** | 500 | 20.4 | 7.0 | 4.80 | 3260 |
| 35 wt % Flame Retardant 4 (FR4)-75 wt % Polystyrene for Polymer Feed | | | | | | |
| Modified CPP C | 20/25/55** | 500 | 20.8 | 7.0 | 3.90 | 3050 |

*Ratio represents Polymer Feed wt %/Stabilizer 1 wt %/Carrier Polyol 1 wt %, based on total weight thereof.
**Ratio represents Polymer Feed wt %/Stabilizer 2 wt %/Carrier Polyol 1 wt %, based on total weight thereof Preparation of Copolymer Polyols with Titanium Dioxide and/or Clay The following additional materials are principally used in forming the exemplary copolymer polyols with titanium dioxide and clay:

| | |
|---|---|
| Clay | A clay marketed as a natural montmorillonite modified with quaternary ammonium salt, having a density of 1.98 g/cm$^3$ and a typical dry particle size by volume of 50% less than 6 μm (available as Cloisite ® 30B from Neunano). |
| Hydrotalcite | A hydrotalcite (defined as layered double hydroxide of general formula Mg$_6$Al$_2$CO$_3$(OH) 4(H$_2$O))-like synthetic compound marketed as a stabilizer in plastics processes such as the production of polyolefines, believed to have an average particle size of 0.5 μm (available as DHT-4A ® from Kisuma Chemicals). |
| Epoxy Resin | A solid epoxy resin having an epoxide equivalent weight of 2000 g/equivalence to 3500 g/equivalence, an epoxide percentage from 1.2% to 2.2%, and a softening point from 135-146° C. (available as D.E.R. ™ 668-20 from The Dow Chemical Company). |
| Polylactic Acid | A biodegradable thermoplastic aliphatic polyester derived from renewable resources (available as Ingeo ™ Biopolymer 3251D from NatureWorks). |
| Stabilizer 1 | A developmental stabilizer having 20 wt % of macromer based on TMI capped polyols, 20 wt % of styrene monomer, and 60 wt % of the first carrier polyol, and having a solids content of 20 wt % (as discussed above). |
| Carrier Polyol 2 | A glycerine initiated polyoxypropylene polyol having a hydroxyl number of 156 mg KOH/g, and a number average molecular weight of 1,000 (available as VORANOL ™ CP1055 from The Dow Chemical Company). |

Exemplary modified copolymer polyols, Working Examples 1A, 1B, 2A, 2B, 3, and 4 are prepared as discussed below. With respect to the examples, the Polystyrene and the indicated functional additive are pre-compounded into a polymer matrix. For pre-compounding, a twin screw extruder (type ZSK 25) in combination with an under-water granulating system (UWG, exemplary systems are available from Pfleiderer) is used. The twin screw extruder has a screw diameter of 25 mm and a barrel length of 1050 mm The stage of pre-compounding the functional additive component with a polystyrene component is performed using similar operating conditions as discussed above, of a speed of 1000 rpm and a temperature from about 180° C. and about 200° C. The pre-compound materials for the polymer feed used in the mechanical dispersion process.

Similar to as discussed above, for the mechanical dispersion process, the polymer matrix is fed to a second twin screw co-rotating extruder fitted with two liquid lines, one for the stabilizer and the other for the carrier polyol, and a granular hopper for the polymer feed. The second twin screw extrude has a screw diameter of 25 mm and barrel length of 940 mm The second extruder is operated at a temperature from about 180° C. and 200° C. and at a speed of 1000 rpm. The polymer feed granulate is fed to the first section of the extruder barrel, where it is heated and transported forward. The liquids are stored in a heated tank from which they are pumped through heated tubing to the injection nozzles, located along the extruder barrel, by means of a gear pump. Samples are filtered over a nylon mesh filters (pore size: 150 μm).

For product characterization, the collected samples are submitted for solids content determination (mini-pulsed NMR method), particle size distribution measurements (light scattering technique, performed on a Beckman Coulter LS230) and viscosity measurements (cone & plate measurements at different shear rates).

Working Examples 1A, 1B, 2A, 2B, 3, and 4, are prepared as shown below:

Working Example 1A

Firstly, the Titanium Dioxide is pre-compounded with Polystyrene at a ratio of 50/50 by weight, using the first twin screw extruder and under-water granulating system. Separately, the Clay is pre-compounded with the Polystyrene at a ratio of 50/50 by weight, using the first twin screw extruder and under-water granulating system. The resultant pellets of the two pre-compounded materials are dry blended are a ratio of 66/33 by weight (i.e., 66 wt % of Polystyrene/Titanium Oxide and 33 wt % of Polystyrene/Clay). Secondly, the resultant dry blended material is added into the second twin screw extruder via the granular hopper, with the speed of the extruder set at 1000 rpm. Stabilizer 1 is added downstream in the extruder, and then the Carrier Polyol 1 is added to the second twin screw extruder. The resultant product includes 30 wt % of solids (Polystyrene/Titanium Oxide and Polystyrene/Clay), 30 wt % of the Stabilizer 1, and 40 wt % of the Carrier Polyol 1. The temperature at the extruder inlet is about 180° C. and about 200° C. across the remaining length thereof. The resultant material sample is collected at the outlet.

Figure 2:
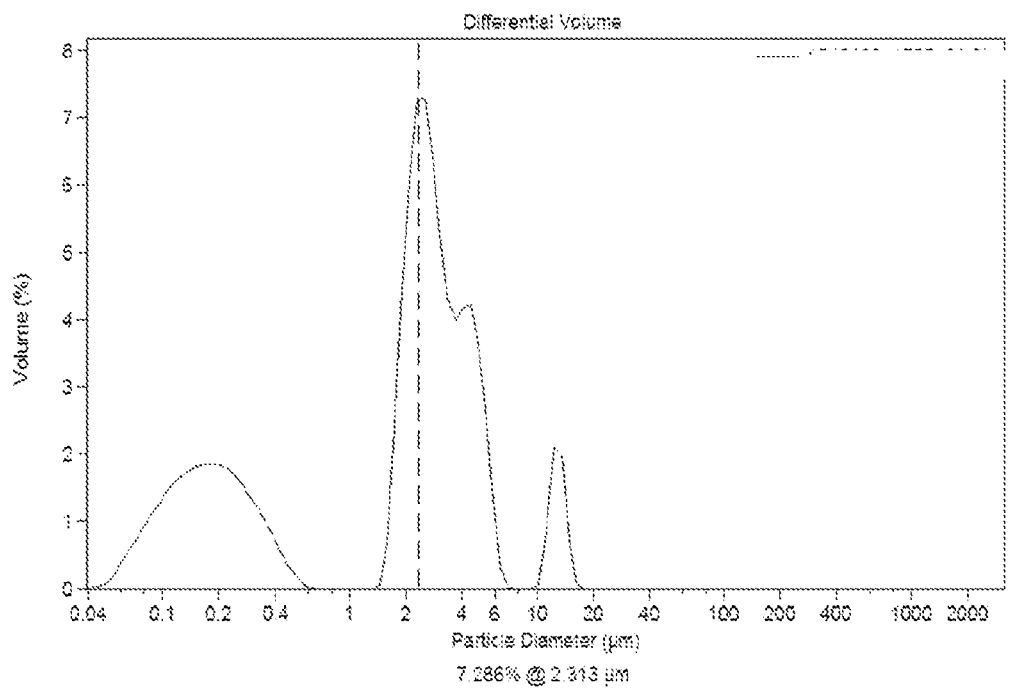
FIG. 2 illustrates a particle size distribution profile of Working Example 1A.
Figure 3:
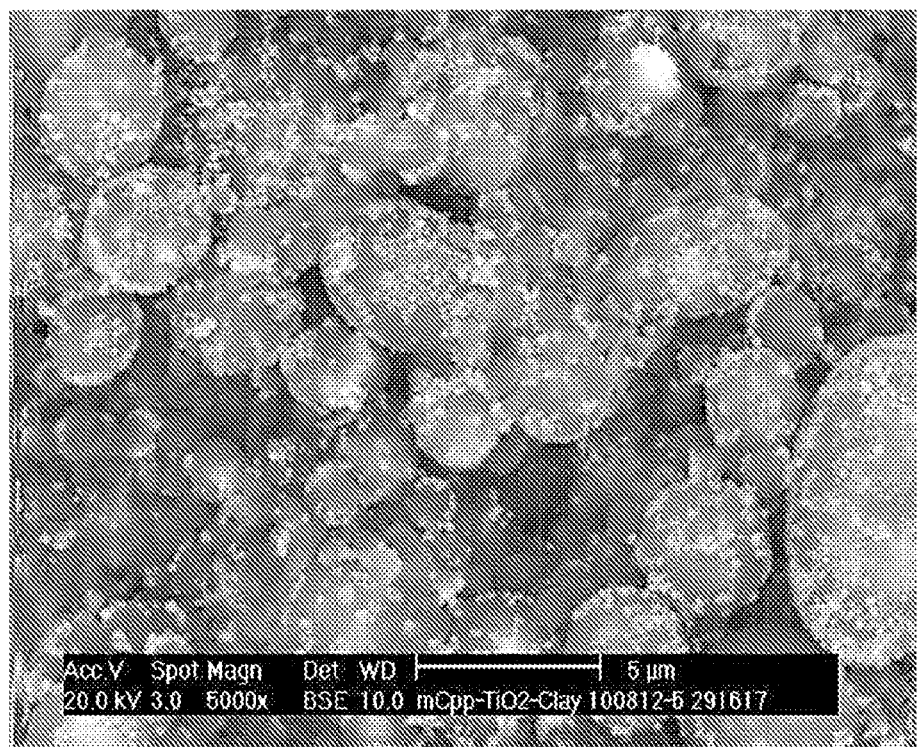
FIG. 3 illustrates a scanning electron microscope (SEM) image of Working Example 1A.

The resultant copolymer polyol has a solids content of 36 wt % (believed to be 30 wt % from a polystyrene based phase and 6 wt % from a Stabilizer 1 based phase). The effective loading of the Titanium Dioxide is 10 wt % and the effective loading of the Clay is 5%. The copolymer polyol has a viscosity of 9500 cP and average particle size of 2.8 μm. The particle size distribution profile is shown in FIG. 2. In addition, further analysis of the polyol was carried out to see the incorporation of the filler in the polymer, and the resultant Scanning Electron Microscope (SEM) image is shown in FIG. 3. For the SEM images, a Philips XL30 FEGSEM scanning electron microscope operating at an accelerating voltage of 10-20 kV and using BSE and SE detectors is used for imaging of the samples.

Working Example 1B

Firstly, the Hydrotalcite is pre-compounded with the Polystyrene at a ratio of 25/75 by weight. Secondly, the resultant material is added to the second twin screw extruder, with the speed set at 1000 rpm. The Stabilizer 1 is added downstream in the extruder, and then the Carrier Polyol 2 is added to the extruder. The resultant product includes 35 wt % of solids (Polystyrene/Hydrotalcite), 35 wt % of the Stabilizer 1, and 30 wt % of the Carrier Polyol 2. The temperature at the extruder inlet is about 180° C. and about 200° C. across the remaining length thereof. The resultant material sample is collected at the outlet. The resultant copolymer polyol has a viscosity of 4540 cP and average particle size of 5.0 µm. The particle size distribution profile is shown in FIG. 4.

Figure 4:
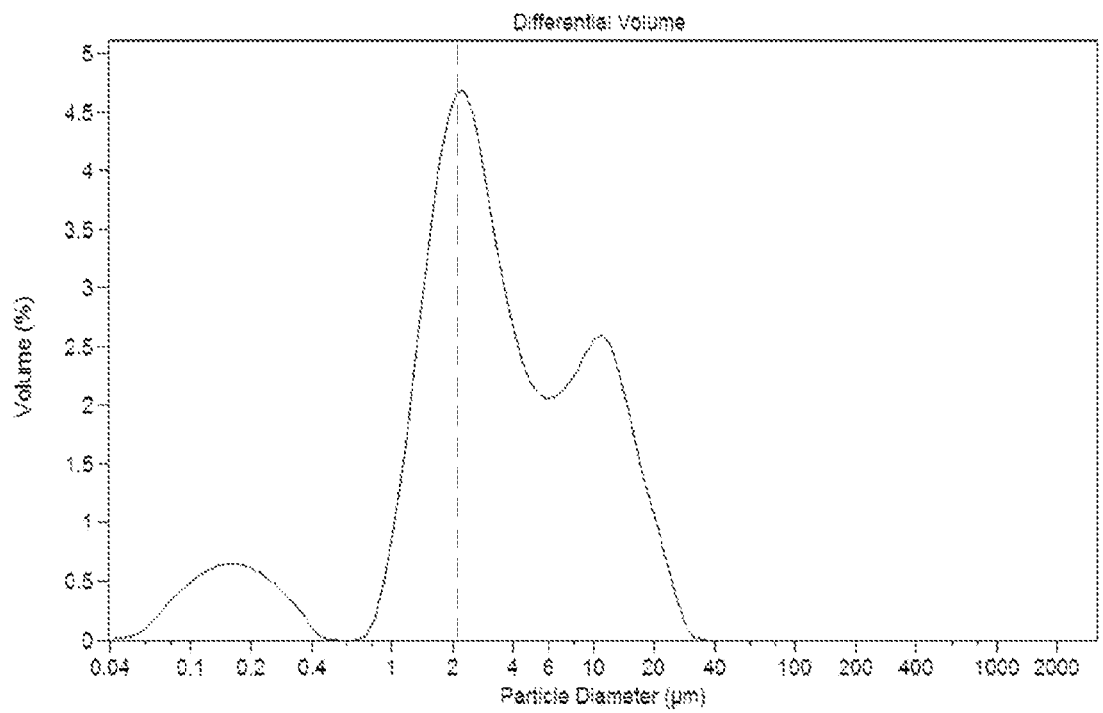
FIG. 4 illustrates a particle size distribution profile of Working Example 1B.

Referring to FIGS. 2 and 4, it is seen that the overall particle size distribution is improved for Working Example 1A relative to Working Example 1B. In particular, for Working Example 1A the range of particle sizes is from greater than 0 to 20 µm. In contrast, for Working Example 1B the range is from greater than 0 to 40 µm. Accordingly, with the use of the pre-compounded mixture in Working Example 1A, a 50% improvement (i.e., decrease of the overall range) in particle size distribution may be realized relative to Working Example 1B. Said in another way, use of a combination of a mineral component having a relatively higher average particle size (e.g., from 1 µm to 15 µm) such as the Clay and a metal oxide component having a relatively low average particle size (e.g., less than 1 µm) such as the Titanium Dioxide, results in a significant improvement in particle size distribution, as compared to use of only a mineral such as hydrotalcite having a relatively low average particle size (e.g., less than 1 µm). In other words, the Titanium Oxide enables the use of large particles, while still providing a relatively narrower particle size distribution.

Working Example 2A

Firstly, the Titanium Dioxide is pre-compounded with Polystyrene at a ratio of 50/50 by weight, using the first twin screw extruder and under-water granulating system. Separately, the Clay is pre-compounded with the Polystyrene at a ratio of 50/50 by weight, using the first twin screw extruder and under-water granulating system. The resultant pellets of the two pre-compounded materials are dry blended are a ratio of 66/33 by weight (i.e., 66 wt % of Polystyrene/Titanium Oxide and 33 wt % of Polystyrene/Clay). Secondly, the resultant dry blended material is added into the second twin screw extruder via the granular hopper, with the speed of the extruder set at 1000 rpm. Stabilizer 1 is added downstream in the extruder, and then the Carrier Polyol 1 is added to the extruder. The resultant product includes 20 wt % of solids (Polystyrene/Titanium Oxide and Polystyrene/Clay), 20 wt % of the Stabilizer 1, and 60 wt % of the Carrier Polyol 1. The temperature at the extruder inlet is about 180° C. and about 200° C. across the remaining length thereof. The resultant material sample is collected at the outlet.

The resultant copolymer polyol has a solids content of 24 wt % (believed to be 20 wt % from a polystyrene based phase and 4 wt % from a stabilizer based phase). The effective loading of the Titanium Dioxide is 6.66 wt % and the effective loading of the Clay is 3.33%. The copolymer polyol has a viscosity of 3200 cP and average particle size of 4.5 µm. The particle size distribution profile is shown in FIG. 5.

Figure 5:
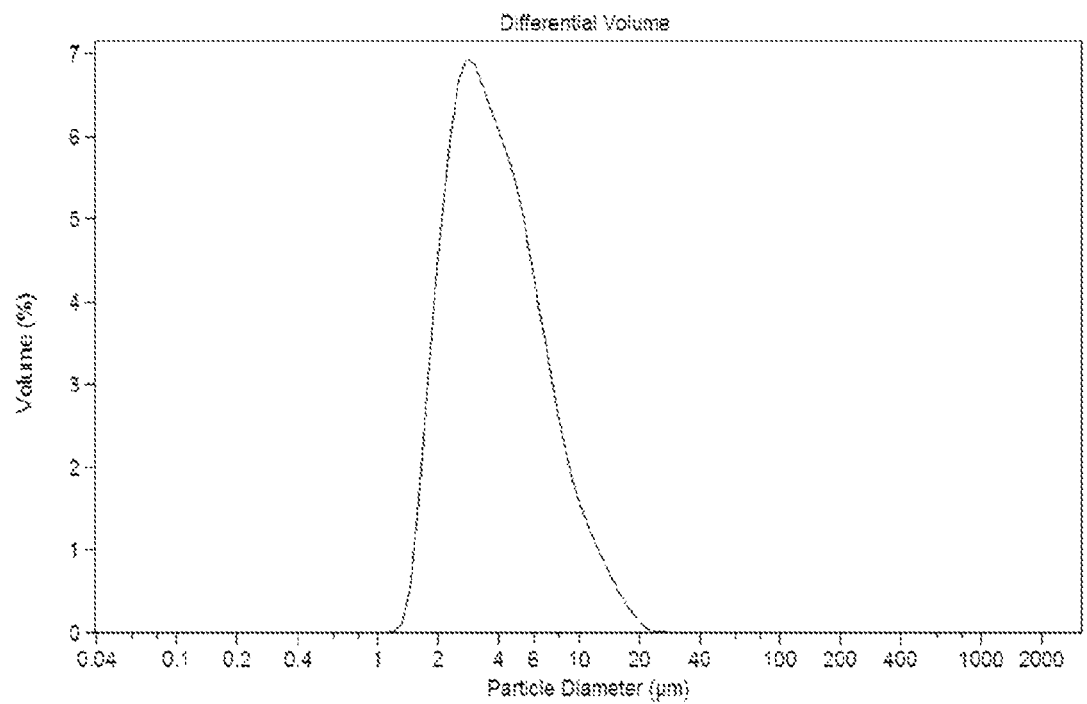
FIG. 5 illustrates a particle size distribution profile of Working Example 2A.

Referring to FIG. 5, it is shown that the particle size distribution is even further improved relative to FIGS. 2 and 3. In particular, it is seen that in FIG. 5, a distribution similar to a Gaussian pattern is realized over the narrow range of from 0 to 25 µm, which may indicate that the distribution of the solids is improved.

Working Example 2B

Firstly, the Clay is pre-compounded with the Polystyrene at a ratio of 50/50 by weight. Secondly, the resultant material is added to the second twin screw extruder, with the speed set at 1000 rpm. The Stabilizer 1 is added downstream in the extruder, and then the Carrier Polyol 1 is added to the extruder. The resultant product includes 10 wt % of solids (Polystyrene/Clay), 10 wt % of the Stabilizer 1, and 80 wt % of the Carrier Polyol 1. The temperature at the extruder inlet is about 180° C. and about 200° C. across the remaining length thereof. The resultant material sample is collected at the outlet.

Figure 6:
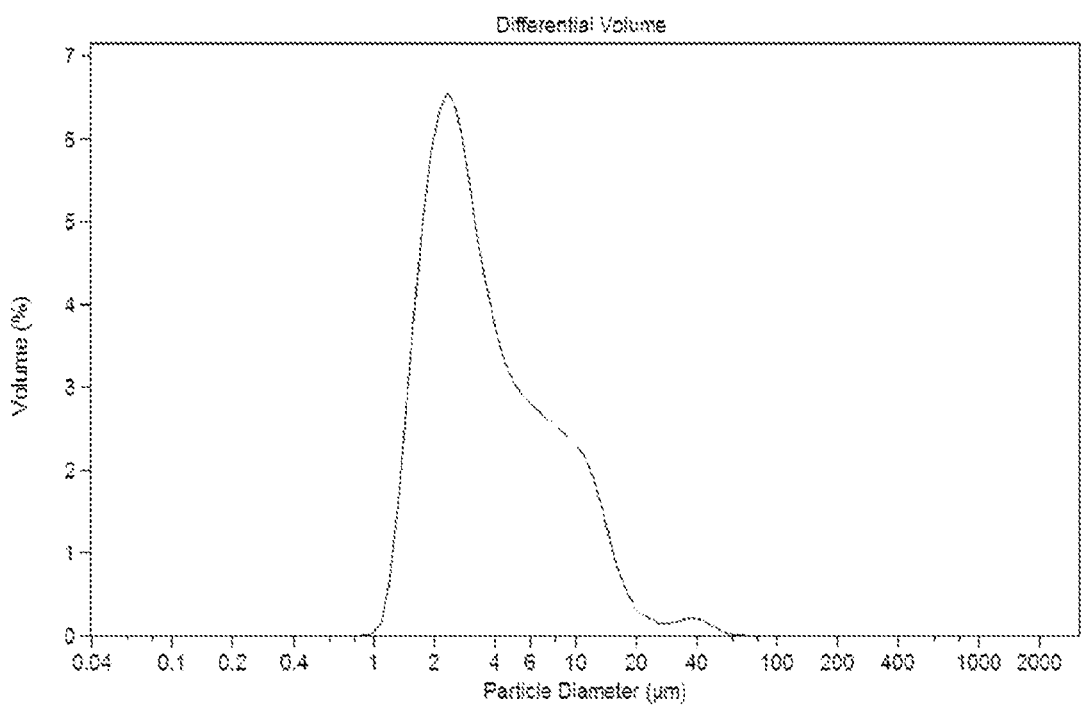
FIG. 6 illustrates a particle size distribution profile of Working Example 2B.

The resultant copolymer polyol has a solids content of 12 wt % (believed to be 10 wt % from a polystyrene based phase and 2 wt % from a stabilizer based phase). The effective loading of the Clay is 5%. The copolymer polyol has a viscosity of 3000 cP and average particle size of 5.0 µm. The particle size distribution profile is shown in FIG. 6, which range of from 0.7 µm to 50 µm is significantly broader than the particle size distribution realized for Working Examples 1 to 3.

Further, referring to Working Examples 1A, 2A, and 2B, it is found that when Clay is pre-compounded with Polystyrene, the solids content of the resultant copolymer polymer may be significantly lower than when both the Clay and Titanium Dioxide are pre-compounded with the Polystyrene, e.g., 100% higher than just Clay. Further, it is believed that first blending titanium dioxide with clay and then pre-compounding the resultant material with polystyrene may help increase total solids content of the resultant copolymer polyol. Accordingly, exemplary embodiments include at least a metal oxide such as titanium oxide pre-compounded with polystyrene, and may additional include another functional additive (such as the high density filler, the solid epoxy resin, or the solid polyester resin).

Working Example 3

Firstly, the solid Epoxy Resin is pre-compounded with Polystyrene at a ratio of 40/60 by weight, using the first twin screw extruder and under-water granulating system. Secondly, the resultant dry blended material is added into the second twin screw extruder via the granular hopper, with the speed of the extruder set at 1000 rpm. Stabilizer 1 is added downstream in the extruder, and then the Carrier Polyol 1 is added to the extruder. The resultant product includes 20 wt % of solids (Polystyrene/Epoxy Resin), 20 wt % of the Stabilizer 1, and 60 wt % of the Carrier Polyol 1. The temperature at the extruder inlet is about 180° C. and about 200° C. across the remaining length thereof. The resultant material sample is collected at the outlet.

Figure 7:
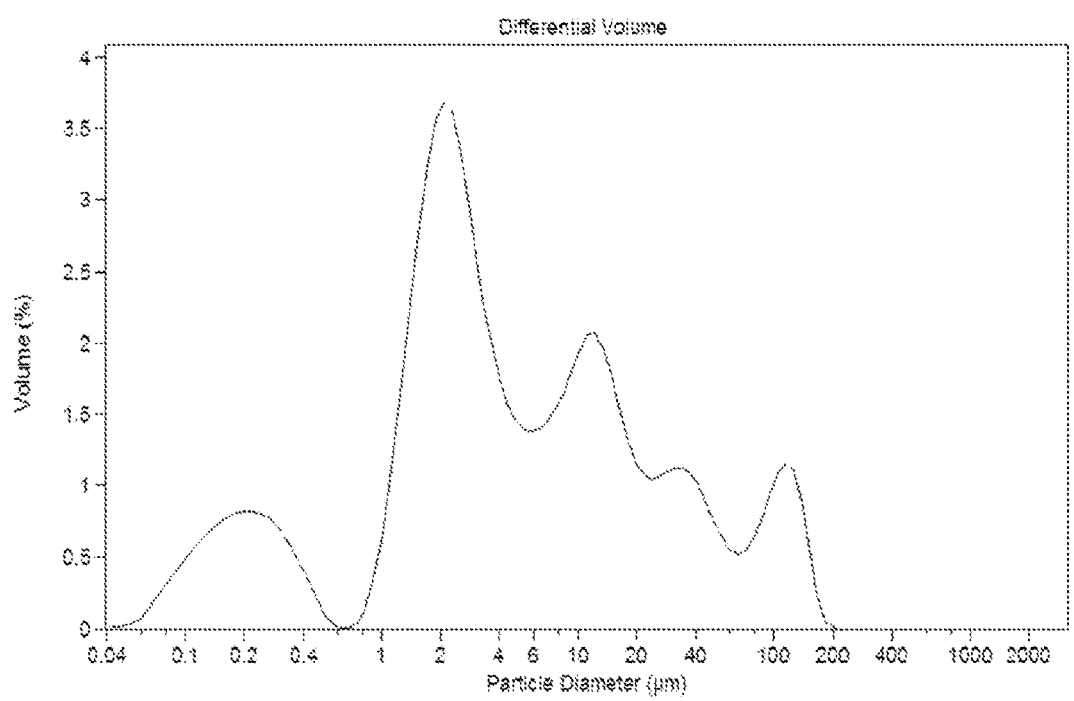
FIG. 7 illustrates a particle size distribution profile of Working Example 3.
Figure 8:
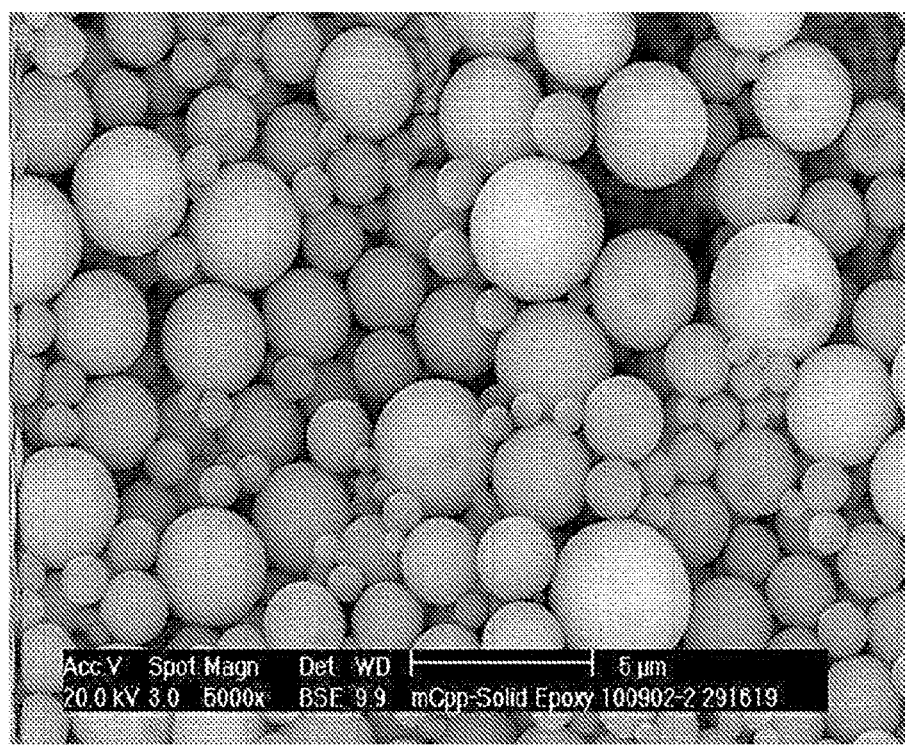
FIG. 8 illustrates a scanning electron microscope (SEM) image of Working Example 3.

The resultant copolymer polyol has a solids content of 24 wt % (believed to be 20 wt % from a polystyrene based phase and 4 wt % from a stabilizer based phase). The copolymer polyol has a viscosity of 10800 cP and average particle size of 17 µm. The particle size distribution profile is shown in FIG. 7. In addition, further analysis of the polyol was carried out to see the incorporation of the filler in the polymer, and the resultant Scanning Electron Microscope (SEM) image is shown in FIG. 8. For the SEM images, a Philips XL30 FEGSEM scanning electron microscope operating at an accelerating voltage of 10-20 kV and using BSE and SE detectors is used for imaging of the samples.

Working Example 4

Firstly, the solid Polylactic Acid is pre-compounded with Polystyrene at a ratio of 33/66 by weight, using the first twin screw extruder and under-water granulating system. Secondly, the resultant dry blended material is added into the second twin screw extruder via the granular hopper, with the speed of the extruder set at 1000 rpm. Stabilizer 1 is added downstream in the extruder, and then the Carrier Polyol 1 is added to the extruder. The resultant product includes 35 wt % of solids (Polystyrene/Epoxy Resin), 35 wt % of the Stabilizer 1, and 30 wt % of the Carrier Polyol 1. The temperature at the extruder inlet is about 180° C. and about 200° C. across the remaining length thereof. The resultant material sample is collected at the outlet.

Figure 9:
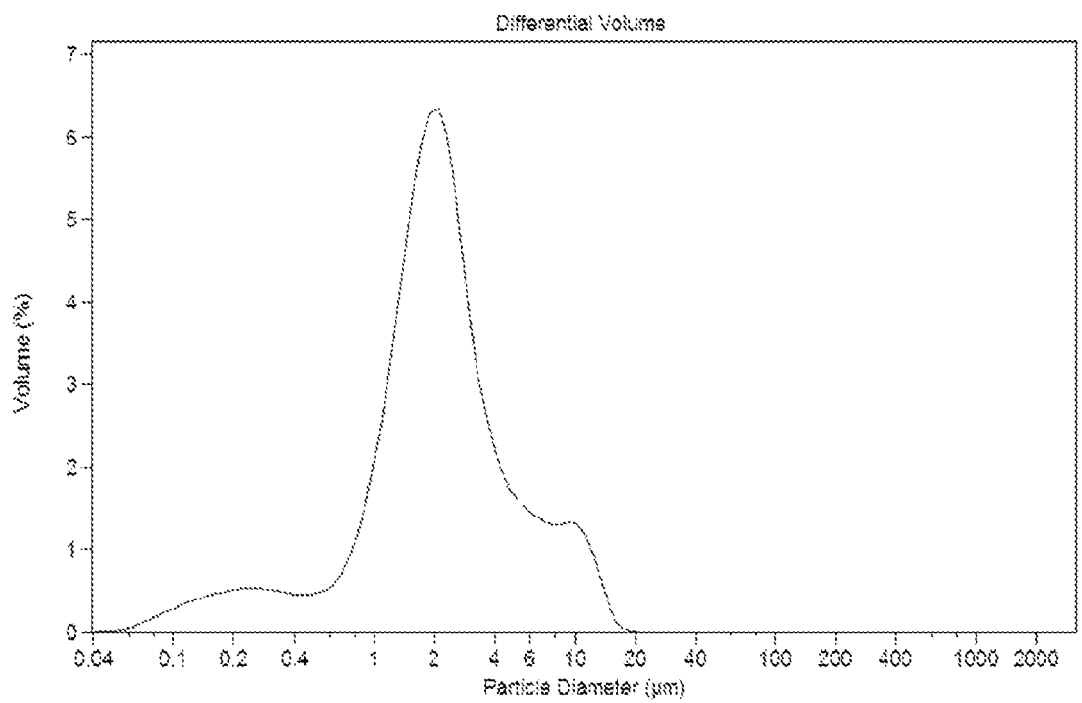
FIG. 9 illustrates a particle size distribution profile of Working Example 4.
Figure 10:
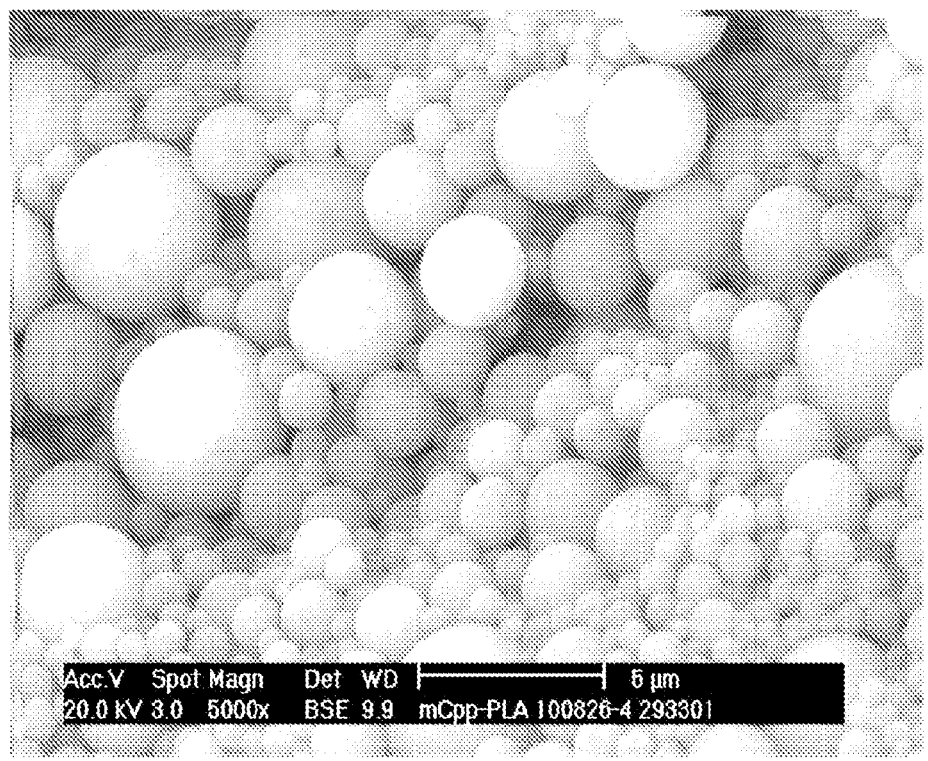
FIG. 10 illustrates a scanning electron microscope (SEM) image of Working Example 4.

The resultant copolymer polyol has a solids content of 24 wt % (believed to be 20 wt % from a polystyrene based phase and 4 wt % from a stabilizer based phase). The copolymer polyol has a viscosity of 7900 cP and average particle size of 2.9 µm. The particle size distribution profile is shown in FIG. 9. In addition, further analysis of the polyol was carried out to see the incorporation of the filler in the polymer, and the resultant Scanning Electron Microscope (SEM) image is shown in FIG. 10. For the SEM images, a Philips XL30 FEGSEM scanning electron microscope operating at an accelerating voltage of 10-20 kV and using BSE and SE detectors is used for imaging of the samples.

Preparation of Polyurethane Foams

The following additional materials are principally used in forming polyurethane foam samples:

| | |
|---|---|
| Modified CPP A | A copolymer polyol prepared as discussed above, including pre-compounded Titanium Oxide (functional additive) and Polystyrene, having a hydroxyl number from 18 to 20 mg KOH/g and a viscosity of 7650 mPa * s (at 25° C., 10 s$^{-1}$). |
| Modified CPP B | A copolymer polyol prepared as discussed above, including pre-compounded Flame Retardant 3 (functional additive) and Polystyrene, having a hydroxyl number from 24 to 26 mg KOH/g and a viscosity of 3260 mPa * s (at 25° C., 10 s$^{-1}$). |
| Modified CPP C | A copolymer polyol prepared as discussed above, including pre-compounded Flame Retardant 4 (functional additive) and Polystyrene, having a hydroxyl number from 24 to 26 mg KOH/g and a viscosity of 3050 mPa * s (at 25° C., 10 s$^{-1}$). |
| CPP 1 | A grafted polyether copolymer polyol having a solids content of from 39 wt % to 42 wt %, a hydroxyl number from 19.5 to 23.0 mg KOH/g, and a viscosity from 4750 to 6250 mPa * s (available as SPECFLEX ™ NC 700 from The Dow Chemical Company). |
| CPP 2 | A copolymer polyol prepared using the same process as Modified CPP A, except the pre-compound stage is excluded and Titanium Oxide is not used in forming the copolymer polyol. Accordingly, CPP 2 is prepared using 30 wt % Polystyrene dispersed in 40 wt % of Carrier Polyol 1 using 30 wt % Stabilizer 2 (i.e., 30 wt % Polymer feed/30 wt % Stabilizer 2/40 wt % Carrier Polyol), and has a total solids content of 36 wt %, an average particle size of 4.01 µm, and a viscosity of 7400 mPa * s (at 25° C., 10 s$^{-1}$). |
| Polyol A | A polyether polyol having a number average molecular weight of 6000 g/mol, a nominal hydroxyl functionality of 3, and a hydroxyl number of 29 KOH mg/g (available as VORANOL ™ 6150 from The Dow Chemical Company). |
| Polyol B | A polyether polyol having a number average molecular weight of 3000 g/mol, a nominal hydroxyl functionality of 3, and a hydroxyl number of 56 KOH mg/g (available as VORANOL ™ WK 3138 from The Dow Chemical Company). |
| DEOA | Diethanolamine |
| Additive | A polyurethane additive (available as ORTEGOL ® 204 from Evonik Industries). |
| Catalyst A | A catalyst that includes 70 percent bis(2-dimethylaminoethyl) ether (available as Niax ™ A-1 from Momentive). |
| Catalyst B | A tertiary amine catalyst (available as Dabco ® 33-LV from Air Products) |
| Catalyst C | Stannous Octoate (available from Sigma-Aldrich). |
| Catalyst D | A delayed action catalyst (available as Niax ™ A-300 from Momentive). |
| Flame Retardant 5 (FR5) | Melamine (available from Sigma-Aldrich). |
| Surfactant A | A silicone surfactant (available as TEGOSTAB ® B-8783 LF2 from Evonik Industries). |
| Surfactant B | A silicone surfactant (available as TEGOSTAB ® B-8715 LF from from Evonik Industries). |

-continued

| | |
|---|---|
| Surfactant C | A silicone surfactant (available as TEGOSTAB ® B-8738 LF from from Evonik Industries). |
| Isocyanate A | An isocyanate composition having a mixture of the 2,4 and 2,6 isomers of toluene diisocyanate (TDI) in a ratio of 80 wt % to 20 wt % (available as VORANATE ™ T-80 from The Dow Chemical Company). |
| Isocyanate B | An isocyanate composition having a blend of 80 wt % of a mixture of the 2,4 and 2,6 isomers of toluene diisocyanate (TDI) in a ratio of 80 wt % to 20 wt %; and 20 wt % of polymeric methylene diphenyl diisocyanate (MDI) (available as SPECFLEX ™ TM 20 from The Dow Chemical Company). |

Molded High Resiliency Foams

Table 3, below, relates to molded polyurethane foam samples that are prepared using Modifier CPP A (Working Example 5), Modifier CPP B (Working Example 6), and Modifier CPP C (Working Example 7) relative to a molded polyurethane foam sampled prepared using a copolymer polyol that does not include a pre-compounded functional additive and a polyol (Comparative Examples A and B), and relative to a molded polyurethane foam sample prepared using only a copolymer polyol that does not include a pre-compounded functional additive (Comparative Example C). As discussed below, significant improvements are realized with respect to aging and fire behavior. In particular, Working Examples 5 to 7 and Comparative Examples A and C are prepared according to the following respective formulations and evaluated as follows:

TABLE 3

| | Working Example 5 | Working Example 6 | Working Example 7 | Comparative Example A | Comparative Example B | Comparative Example C |
|---|---|---|---|---|---|---|
| Polyol Formulation of Isocyanate-Reactive Component (parts by weight) | | | | | | |
| Modified CPP A | 29.0 | — | — | — | — | — |
| Modified CPP B | — | 60.0 | — | — | — | — |
| Modified CPP C | — | — | 60.0 | — | — | — |
| CPP 1 | — | — | — | 30.0 | — | — |
| CPP 2 | — | — | — | — | 33.0 | — |
| Polyol A | 71.0 | 40.0 | 40.0 | 70.0 | 67.0 | 100.0 |
| Remainder of Isocyanate-Reactive Component (parts by weight) | | | | | | |
| DEOA | 0.7 | 0.7 | 0.7 | 0.7 | 0.7 | 0.7 |
| Catalyst A | 0.1 | 0.1 | 0.1 | 0.1 | 0.1 | 0.1 |
| Catalyst B | 0.3 | 0.3 | 0.3 | 0.3 | 0.3 | 0.3 |
| Catalyst D | 0.1 | 0.1 | 0.1 | 0.1 | 0.1 | 0.1 |
| Surfactant B | 1.0 | 1.0 | 1.0 | 1.0 | 1.0 | 1.0 |
| Surfactant C | 0.6 | 0.6 | 0.6 | 0.6 | 0.6 | 0.6 |
| Water | 3.0 | 3.0 | 3.0 | 3.0 | 3.0 | 3.0 |
| Isocyanate Component | | | | | | |
| Index (relative amount of Isocyanate B) | 100 | 100 | 100 | 100 | 100 | 100 |
| Properties of Mold Foam Samples | | | | | | |
| Foam Odor | Mild | Mild | Mild | Styrenic | Mild | Mild |
| Cell Structure | Ok | Ok | Large | Ok | Ok | Ok |
| Exit Time (sec) | 62 | 67 | 64 | 66 | 64 | 71 |
| Demold time (min) | 5 | 5 | 5 | 5 | 5 | 5 |
| Part weight (g) | 403 | 404 | 400 | 402 | 395 | 403 |
| Properties of Cut Foam Samples | | | | | | |
| Core density (kg/m$^3$) | 41.3 | 41.4 | 43.4 | 41.6 | 40.0 | 43.3 |
| 50% CFD (kPa) | 4.1 | 5.0 | 5.6 | 5.0 | 4.5 | 3.5 |
| Hysteresis (%) | 82.0 | 78.3 | 78 | 80.1 | 80.5 | 83.5 |
| Airflow (cfm) | 4.7 | 4.7 | 3.4 | 4.6 | 4.8 | 4.5 |
| Resilience (%) | 70 | 67 | 63 | 66 | 67 | 70 |
| 50% CS (% CD) | 7.2 | 7.8 | 7.8 | 7.5 | 6.8 | 6.6 |
| 75% CS (% CD) | 5.2 | 6.6 | 6.5 | 6.4 | 6.4 | 5.1 |
| Fire Behavior Testing (FR CAL 117) | | | | | | |
| Char length (cm) | 9 | 10 | 8 | 11 | 9 | 11 |
| After flame time (sec) | 2 | 0 | 0 | 3 | 3 | 4 |

Working Examples 5 to 7 and Comparative Examples A to C are prepared by weighing components (e.g., water, catalysts, surfactants, etc.) in a plastic cup. Then, pre-mixing at room temperature (approximately 23° C.) of the components listed for the respective Polyol Formulation of the Isocyanate-Reactive Component and the respective Remainder of the Isocyanate-Reactive Component is performed. After 30 seconds, the Isocyanate Component is added while stirring continuously, and then three seconds later the resultant reaction mixture is poured into a metallic mold (a 30×30×10 cm aluminum mold) maintained at 60° C. Next, the mold is closed with a lid and the resultant demold time is reported in Table 3.

Referring to Table 3, it is seen that Working Examples 5 to 7 have improved fire behavior properties with respect to the FR CAL 117 test, as the after flame time is reduced or avoided. Further, it is seen that Working Examples 5 to 7 and Comparative Examples A to C have similar foam properties with respect to density, compression force deflection, hysteresis, airflow, resilience, compression set, and cell structure. Therefore, it is shown that Working Examples 5 to 7 that include modified copolymer polyols form similar foam properties compared to Comparative Examples A to C, with the improved benefits associated with the addition of the benefits associated the functional additives. For example, the fire behavior of Working Examples 5 to 7 is improved or comparable reparative to Comparative Examples A to C. In addition, with respect to Comparative Example A, a styrenic odor is realized as CPP 1 is made from in situ polymerization of styrene monomers, hence contains traces of residual Styrene monomer. It is noted that in Working Examples 5 to 7, such a styrenic odor may not be realized as the polystyrene is melted at a temperature below the break down temperature of the polystyrene polymer.

Figure 11A:
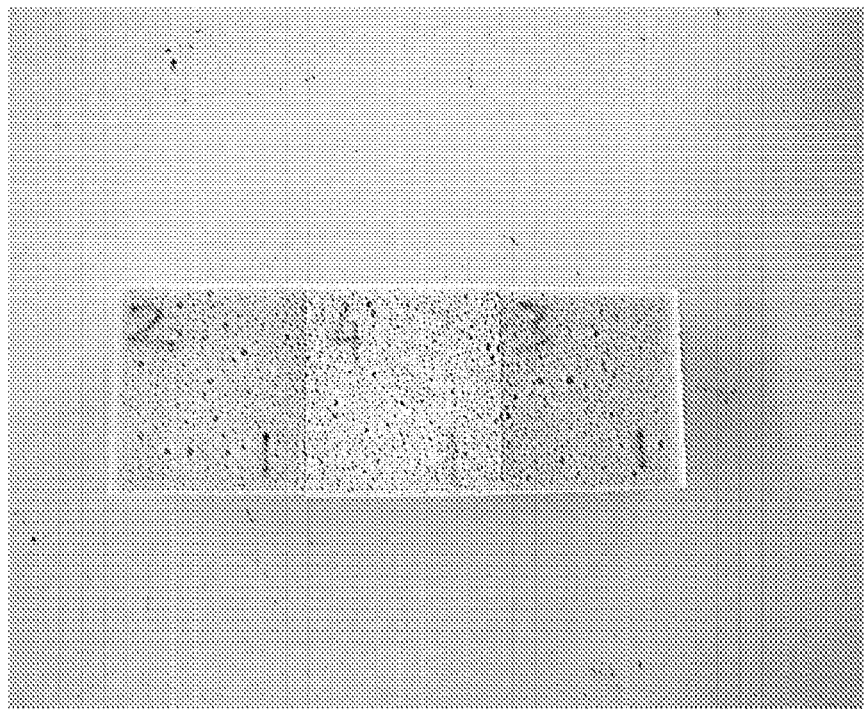
FIGS. 11A and 11B illustrate foam samples corresponding to Working Example 5, Comparative Example A, and Comparative Example B.
Figure 11B:
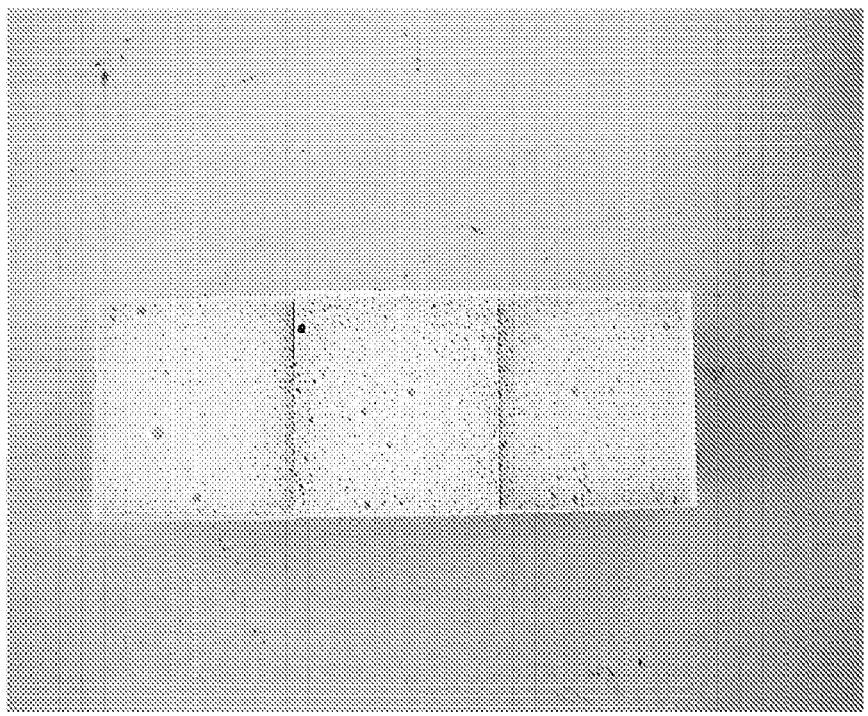

Further, with respect to the functional additives, referring to FIG. 11A, Working Example 5 and Comparative Examples A and B are also evaluated for aging when exposed to sun and light radiation. In particular, FIG. 11A illustrates the upper side of Working Example 5 (labeled as 4/1), Comparative Example A (labeled as 2/1), and Comparative Example B (labeled as 3/1), after exposure to approximately six (6) months of sun and light radiation. Working Example 5 (the sample in the middle) demonstrates significantly less yellowing relative to Comparative Example A and Comparative Example B. FIG. 11B illustrates the lower side of the samples of Working Example 5, Comparative Example A, and Comparative Example B shown in FIG. 11A, in which the lower side was not directly exposed to sun and light radiation during the six month period. Working Example 5 demonstrates a similar appearance to both Comparative Example A and Comparative Example B.

Foam odor is observed by an objective odor test. Cell structure is visually inspected. The exit time is visually observed and denotes the time when a foaming mass reaches vent holes in a mold. The demold time is visually observed and denotes time when a foam can be demolded substantially without deformation. The density is measured according to ISO 3386. CFD (i.e., compression force deflection) is a measure of firmness (or stiffness) at a deflection of 50%, and is measured according to ISO 3386. Hysteresis and Air flow through the foam are measured according to ASTM D-3574. Foam resiliency is measured according to ASTM 3574. Tear strength is measured according to ASTM D-624. Compression set (CS) is measured according to ISO 1856. 75% Compression set at is a measure of the permanent deformation of a foam sample after it has been compressed to 75% of its original thickness between two metal plates for a controlled time period and temperature condition. Similarly, 50% Compression set is a measure of permanent deformation of a foam sample after it has been compressed to 50% of its original thickness.

For fire behavior testing, FR Cal 117 refers to testing according to the State Of California, Department of Consumer Affairs, Bureau of Home Furnishings and Thermal Insulation, Technical Bulletin 117 (Requirements, Test Procedure and Apparatus for Testing the Flame Retardance of Resilient Filling Materials Used in Upholstered Furniture) of March 2000, section A part 1 (Cal 117). FR Cal 117 is a vertical burning test. For the test, the foams are cut into specimens (304.8 mm×76.2 mm×12.7 mm) using an electric saw. For each formulation, 10 specimens are tested (five before aging, 5 after aging). Specimens are exposed to a flame for 12 seconds and then Char Length and After Flame Time (AFT) are recorded.

Free Rise Flexible Foams

Table 4, below, relates to flexible polyurethane foam samples that are prepared using Modifier CPP A (Working Examples 8 to 11) relative to a flexible polyurethane foam samples prepared using CPP 1 and Titanium Oxide as separate components (Comparative Examples D to G), and relative to a flexible polyurethane foam sample prepared using a two polyol blend (Comparative Example H). In particular, Working Examples 6 to 9 and Comparative Examples D to H are prepared according to the following respective formulations and evaluated as follows:

TABLE 4

| | Ex 8 | Ex 9 | Ex 10 | Ex 11 | Ex D | Ex E | Ex F | Ex G | Ex H |
|---|---|---|---|---|---|---|---|---|---|
| Polyol Formulation of Isocyanate-Reactive Component (parts by weight) | | | | | | | | | |
| Modified CPP A | 10.0 | 20.0 | 30.0 | 50.0 | — | — | — | — | — |
| CPP 1 | — | — | — | — | 8.0 | 16.0 | 25.0 | 41.0 | — |
| Titanium Oxide | — | — | — | — | 1.8 | 3.5 | 5.3 | 8.6 | — |
| Polyol A | 68.0 | 58.0 | 48.0 | 28.0 | 70.0 | 62.0 | 53.0 | 37.0 | 78.0 |
| Polyol B | 22.0 | 22.0 | 22.0 | 22.0 | 22.0 | 22.0 | 22.0 | 22.0 | 22.0 |
| Remainder of Isocyanate-Reactive Component (parts by weight) | | | | | | | | | |
| DEOA | 1.2 | 1.2 | 1.2 | 1.2 | 1.2 | 1.2 | 1.2 | 1.2 | 1.2 |
| Additive | 1.0 | 1.0 | 1.0 | 1.0 | 1.0 | 1.0 | 1.0 | 1.0 | 1.0 |
| Catalyst A | <0.1 | <0.1 | <0.1 | <0.1 | <0.1 | <0.1 | <0.1 | <0.1 | <0.1 |
| Catalyst B | 0.2 | 0.2 | 0.2 | 0.2 | 0.2 | 0.2 | 0.2 | 0.2 | 0.2 |
| Surfactant A | 0.3 | 0.3 | 0.3 | 0.3 | 0.3 | 0.3 | 0.3 | 0.3 | 0.3 |
| SO | 0.2 | 0.2 | 0.2 | 0.2 | 0.2 | 0.2 | 0.2 | 0.2 | 0.2 |

TABLE 4-continued

|  | Ex 8 | Ex 9 | Ex 10 | Ex 11 | Ex D | Ex E | Ex F | Ex G | Ex H |
|---|---|---|---|---|---|---|---|---|---|
| Isocyanate Component | | | | | | | | | |
| Index (relative amount of Isocyanate A) | 105 | 105 | 105 | 105 | 105 | 105 | 105 | 105 | 105 |
| Discoloration Testing | | | | | | | | | |
| Color @ time = 0 | 1.3 | 1.5 | 1.2 | 1.2 | 2.6 | 3.8 | 5.0 | 5.0 | 1.7 |
| Color @ Time = 10 hours | 15.2 | 12.4 | 10.5 | 8.5 | 9.5 | 10.2 | 10.3 | 10.5 | 18.0 |

Working Examples 8 to 11 and Comparative Examples D to H are prepared weighing components in a plastic cup. Then, pre-mixing at 2000 RPM and room temperature (approximately 23° C.) 200 grams total weight of the components listed for the respective Polyol Formulation of the Isocyanate-Reactive Component and the respective Remainder of the Isocyanate-Reactive Component. After 30 seconds, the Isocyanate Component is added while stirring continuously, and then three seconds later the resultant reaction mixture is poured 20×20×20 cm cardboard box and allowed to rise. Post-curing is carried out by placing the resultant foam sample, while still in the cardboard box, in an oven heated at 140° C. for a period of 5 minutes.

The special consideration for preparing Comparative Examples D to G, is the inclusion of a stage immediately before pre-mixing the components of the Isocyanate-reactive Component, which stage includes blending the Titanium Oxide with the CPP 1. In particular, the Titanium Oxide may have stability issues (e.g., short shelf life) in a polyol formulation. This additional stage of blending functional additives such Titanium Oxide with copolymer polyol is avoided by providing the functional additive directly in the copolymer polyol. Further, it is noted that Working Examples 8 to 11 enable a high amount of the Titanium Oxide to be loaded into the formulation and provide the additional benefit of a whiter color both initially and after 10 hours, which is accomplished without compromising the stability/shelf life of the formulations. It is noted that for Working Example 8 to 11, the total amount of $TiO_2$ is estimated to respectively be 1.8, 3.5, 5.3, and 8.6 parts by weight.

Referring to Table 4, the flexible polyurethane foam samples are evaluated for color change during discoloration testing. For the testing, foam samples are cut into 11 cm×7.5 cm×1 cm pieces. The rate of UV foam discoloration is determined using a QUV Weatherometer fitted with 350 nm fluorescent tubes. Delta b values are recorded for foams with a Colorimeter at 0, 2, 4, 6, 8 and 10 hours UV exposure. A chamber temperature of 35° C. is maintained while samples are exposed to UV light. Further, it is noted that the Working Examples 8 to 11 may provide the added advantage of improved storable stability.

Each of Working Examples 8, 9, 10, and 11 demonstrates a lower initial color value, indicating that the initial color of samples is improved relative to Comparative Examples D through H. Further, Working Examples 8 to 11 demonstrate a good color value after 10 hours relative to Comparative Examples D through H.

CMHR Free Rise Foams

Table 5, below, relates to combustion modified high resilient (CMHR) molded polyurethane foam samples that are prepared using Modifier CPP A (Working Example 12), Modifier CPP B (Working Example 13), and Modifier CPP C (Working Example 14) relative to a CMHR molded polyurethane foam sample prepared using a copolymer polyol that does not include an functional additive (Comparative Examples I and J), and relative to a CMHR molded polyurethane foam sample prepared using a two polyol blend (Comparative Example K). In particular, Working Examples 12 to 14 and Comparative Examples I to K are prepared according to the following respective formulations and evaluated as follows:

TABLE 5

|  | Working Example 12 | Working Example 13 | Working Example 14 | Comparative Example I | Comparative Example J | Comparative Example K |
|---|---|---|---|---|---|---|
| Polyol Formulation of Isocyanate-Reactive Component (parts by weight) | | | | | | |
| Modified CPP A | 20.0 | — | — | — | — | — |
| Modified CPP B | — | 20.0 | — | — | — | — |
| Modified CPP C | — | — | 20.0 | — | — | — |
| CPP 1 | — | — | — | 10.0 | — | — |
| CPP 2 | — | — | — | — | 22.0 | — |
| Polyol A | 58.0 | 58.0 | 58.0 | 68.0 | 56.0 | 78.0 |
| Polyol B | 22.0 | 22.0 | 22.0 | 22.0 | 22.0 | 22.0 |
| Remainder of Isocyanate-Reactive Component (parts by weight) | | | | | | |
| DEOA | 1.2 | 1.2 | 1.2 | 1.2 | 1.2 | 1.2 |
| Additive | 1.0 | 1.0 | 1.0 | 1.0 | 1.0 | 1.0 |
| Catalyst A | <0.1 | <0.1 | <0.1 | <0.1 | <0.1 | <0.1 |
| Catalyst B | 0.2 | 0.2 | 0.2 | 0.2 | 0.2 | 0.2 |
| Catalyst C | 0.2 | 0.2 | 0.2 | 0.2 | 0.2 | 0.2 |

TABLE 5-continued

|  | Working Example 12 | Working Example 13 | Working Example 14 | Comparative Example I | Comparative Example J | Comparative Example K |
|---|---|---|---|---|---|---|
| Flame Retardant 5 | 22.0 | 22.0 | 22.0 | 22.0 | 22.0 | 22.0 |
| Surfactant A | 0.3 | 0.3 | 0.3 | 0.3 | 0.3 | 0.3 |
| Water | 2.6 | 2.6 | 2.6 | 2.6 | 2.6 | 2.6 |
| Isocyanate Component | | | | | | |
| Index (relative amount of Isocyanate A) | 110 | 110 | 110 | 110 | 110 | 110 |
| Properties | | | | | | |
| Core density (kg/m$^3$) | 34.3 | 33.0 | 34.4 | 35.2 | 34.3 | 35.9 |
| 50% CFD (kPa) | 3.9 | 3.4 | 3.6 | 4.0 | 4.3 | 4.0 |
| Hysteresis (%) | 71.9 | 73.1 | 73.6 | 72.1 | 69.3 | 74.4 |
| Airflow (cfm) | 4.1 | 5.3 | 5.6 | 4.8 | 4.7 | 4.6 |
| Resilience (%) | 55 | 56 | 57 | 54 | 53 | 55 |
| Tear Strength (N/m) | 278 | 252 | 253 | 312 | 276 | 253 |
| 70% WCS (% CD) | 22.7 | 19.1 | 16.1 | 20.2 | 29.3 | 11.0 |
| 75% CS (% CT) | 5.5 | 5.4 | 5.5 | 5.3 | 6.2 | 4.3 |
| 90% CS (% CT) | 7.0 | 6.2 | 6.4 | 6.1 | 6.5 | 4.9 |

Working Examples 12 to 14 and Comparative Examples 1 to K are prepared weighing components in a plastic cup. Then, pre-mixing at 2000 RPM and room temperature (approximately 23° C.) 200 grams total weight of the components listed for the respective Polyol Formulation of the Isocyanate-Reactive Component and the respective Remainder of the Isocyanate-Reactive Component. After 30 seconds, the Isocyanate Component is added while stirring continuously, and then three seconds later the resultant reaction mixture is poured 20×20×20 cm cardboard box and allowed to rise. Post-curing is carried out by placing the resultant foam sample, while still in the cardboard box, in an oven heated at 140° C. for a period of 5 minutes Referring to Table 5, it is seen that good CMHR foams, which has a high weight percent of a flame retardant, can be prepared using the modified copolymer polyols. Said in another way, it is found that use of the modified copolymer polyols according to exemplary embodiments, still allows for high loading of other additives such as flame retardants, without comprising foam properties and still allowing for the various advantages (e.g., as discussed above) associated with the use of the modified copolymer polyols. In particular, it is shown that Working Examples 12 to 14 that include the Modified CPP A, Modified CPP B, and Modified CPP C, respectively, provide similar foam properties compared to Comparative Examples I to K.

The density is measured according to ISO 3386. CFD (i.e., compression force deflection) is a measure of firmness (or stiffness) at a deflection of 50%, and is measured according to ISO 3386. Hysteresis and Air flow through the foam are measured according to ASTM D-3574. Foam resiliency is measured according to ASTM 3574. Tear strength is measured according to ASTM D-624. Compression set (CS) is measured according to ISO 1856. 75% Compression set at is a measure of the permanent deformation of a foam sample after it has been compressed to 75% of its original thickness between two metal plates for a controlled time period and temperature condition. Similarly, 90% Compression set is a measure of permanent deformation of a foam sample after it has been compressed to 90% of its original thickness.

The invention claimed is:

1. A method for making a copolymer polyol, comprising:
   (a) forming a pre-compounded thermoplastic polymeric composition by compounding from 10 wt % to 90 wt % of a solid functional additive component with from 10 wt % to 90 wt % of a polystyrene component, wherein the pre-compounded thermoplastic polymeric composition is prepared, at least in part, by the combined used of a twin-screw extruder and an under-water granulating system;
   (b) melting the pre-compounded thermoplastic polymeric composition to form a melted thermoplastic polymeric composition;
   (c) combining the melted thermoplastic polymeric composition with a carrier polyol component in the presence of a stabilizer component to form a pre-mixture that includes the pre-compounded thermoplastic polymeric composition dispersed within a continuous phase of the carrier polyol component; and
   (d) cooling the pre-mixture to form the copolymer polyol.

2. The method as claimed in claim 1, wherein the pre-compounded thermoplastic polymeric composition is formed in a first extruder and the melting of the pre-compounded thermoplastic polymeric composition is performed in a second extruder that is separate from the first extruder.

3. The method as claimed in claim 2, wherein the combining of the melted thermoplastic polymeric composition with the carrier polyol component is performed in the second extruder.

4. The method as claimed in claim 2, further comprising pelletizing the pre compounded thermoplastic polymeric composition after exiting the first extruder and prior to adding the pre compounded thermoplastic polymeric composition to the second extruder.

5. The method as claimed in claim 1, wherein the copolymer polyol has a solids content from 10 wt % to 80 wt %, includes from 5 wt % to 80 wt % of the pre-compounded thermoplastic polymeric composition, includes from 5 wt % to 60 wt % of the stabilizer component, and from 15 wt % to 90 wt % of the carrier polyol component.

6. The method as claimed in claim 1, wherein the solid functional additive component includes a non-meltable solid functional additive that has a melting point of at least 200° C., the non-meltable solid functional additive being selected from the group of a metal oxide, a flame retardant, and a high density filler.

7. The method as claimed in claim 1, wherein the solid functional additive component includes a meltable solid functional additive that has a melting point below 200° C., the meltable solid functional additive being selected from the group of an epoxy resin and a polyester resin.

8. The method as claimed in claim 1, wherein the pre-compounded thermoplastic polymeric composition includes from 20 wt % to 70 wt % of a metal oxide, based on the total weight of the pre-compounded thermoplastic polymeric composition, the metal oxide being a pigment metal oxide.

9. The method as claimed in claim 1, wherein the pre-compounded thermoplastic polymeric composition includes from 20 wt % to 70 wt %, based on the total weight of the pre-compounded thermoplastic polymeric composition, of flame retardant, the flame retardant being a halogen-free flame retardant.

10. A method for making a copolymer polyol, comprising:
(a) forming a pre-compounded thermoplastic polymeric composition by compounding from 10 wt % to 90 wt % of a solid functional additive component with from 10 wt % to 90 wt % of a polystyrene component, wherein the pre-compounded thermoplastic polymeric composition is derived from a first functional additive component that includes a first functional additive and a first polystyrene component, the pre-compounded thermoplastic polymeric composition further including a second, separately pre-compounded component that is derived from a second functional additive component that includes a second functional additive that is different from the first functional additive and a second polystyrene component;
(b) melting the pre-compounded thermoplastic polymeric composition to form a melted thermoplastic polymeric composition;
(c) combining the melted thermoplastic polymeric composition with a carrier polyol component in the presence of a stabilizer component to form a pre-mixture that includes the pre-compounded thermoplastic polymeric composition dispersed within a continuous phase of the carrier polyol component; and
(d) cooling the pre-mixture to form the copolymer polyol.

* * * * *